US010377483B2

(12) United States Patent
Champagne, Jr. et al.

(10) Patent No.: US 10,377,483 B2
(45) Date of Patent: Aug. 13, 2019

(54) SIX DEGREE OF FREEDOM AERIAL VEHICLE WITH OFFSET PROPULSION MECHANISMS

(71) Applicant: Amazon Technologies, Inc., Seattle, WA (US)

(72) Inventors: Robert Roy Champagne, Jr., Kirkland, WA (US); Gur Kimchi, Bellevue, WA (US); Louis LeRoi LeGrand, III, Seattle, WA (US); Nicholas Hampel Roberts, Seattle, WA (US); Ricky Dean Welsh, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 15/384,899

(22) Filed: Dec. 20, 2016

(65) Prior Publication Data

US 2017/0253332 A1 Sep. 7, 2017

Related U.S. Application Data

(63) Continuation-in-part of application No. 15/057,919, filed on Mar. 1, 2016.

(51) Int. Cl.
*B64C 39/02* (2006.01)
*G05D 1/08* (2006.01)

(52) U.S. Cl.
CPC ............ *B64C 39/024* (2013.01); *B64C 39/02* (2013.01); *G05D 1/0858* (2013.01);
(Continued)

(58) Field of Classification Search
CPC . B64C 39/024; B64C 39/02; B64C 2201/165; B64C 2201/145;
(Continued)

(56) References Cited

U.S. PATENT DOCUMENTS 3,350,035 A 10/1967 Schlieben
8,453,962 B2 * 6/2013 Shaw ...................... B64C 27/20
244/12.4

(Continued)

FOREIGN PATENT DOCUMENTS

CN 103625640 A 3/2014
DE 102009033821 A1 1/2011
(Continued)

OTHER PUBLICATIONS

Andrew Rosenblum et al, "The Jets of the Future," May 1, 2012, Retrieved from the Internet on Mar. 27, 2018: URL: https://www.popsci.com/technology/article/2012-04/jets-future, pp. 1-9.
(Continued)

*Primary Examiner* — Valentina Xavier
(74) *Attorney, Agent, or Firm* — Athorus, PLLC

(57) ABSTRACT

This disclosure describes an aerial vehicle, such as an unmanned aerial vehicle ("UAV"), which includes a plurality of maneuverability propulsion mechanisms that enable the aerial vehicle to move in any of the six degrees of freedom (surge, sway, heave, pitch, yaw, and roll). The aerial vehicle may also include a lifting propulsion mechanism that operates to generate a force sufficient to maintain the aerial vehicle at an altitude.

20 Claims, 23 Drawing Sheets

(52) U.S. Cl.
CPC .. *B64C 2201/024* (2013.01); *B64C 2201/027* (2013.01); *B64C 2201/108* (2013.01); *B64C 2201/128* (2013.01); *B64C 2201/141* (2013.01); *B64C 2201/145* (2013.01); *B64C 2201/165* (2013.01)

(58) Field of Classification Search
CPC ........ B64C 2201/027; B64C 2201/128; B64C 2201/108; B64C 2201/024; B64C 2201/141
See application file for complete search history.

(56) References Cited

U.S. PATENT DOCUMENTS

| | | | | |
|---|---|---|---|---|
| 9,944,386 | B1 * | 4/2018 | Reichert | B64C 27/08 |
| 10,035,592 | B1 * | 7/2018 | Hanlon | B64C 39/024 |
| 10,086,931 | B2 * | 10/2018 | Reichert | B64C 27/08 |
| 2007/0023581 | A1 * | 2/2007 | La | B64C 27/20 244/165 |
| 2011/0042509 | A1 | 2/2011 | Bevirt et al. | |
| 2015/0379876 | A1 * | 12/2015 | Navot | G08G 5/0021 701/301 |
| 2016/0159471 | A1 * | 6/2016 | Chan | B64C 39/024 244/39 |
| 2016/0159472 | A1 * | 6/2016 | Chan | B64C 27/08 244/39 |
| 2016/0244157 | A1 * | 8/2016 | Welsh | B64C 11/46 |
| 2016/0375997 | A1 * | 12/2016 | Welsh | B64C 39/024 244/17.23 |
| 2017/0217571 | A1 * | 8/2017 | Deng | B64C 25/10 |
| 2017/0247107 | A1 * | 8/2017 | Hauer | B64C 39/024 |
| 2017/0274984 | A1 * | 9/2017 | Beckman | B64C 11/50 |
| 2018/0083503 | A1 * | 3/2018 | Beckman | H02K 1/2786 |
| 2018/0229837 | A1 * | 8/2018 | Kimchi | B64C 27/52 |

FOREIGN PATENT DOCUMENTS

| | | | | |
|---|---|---|---|---|
| EP | 1775214 | A1 | 4/2007 | |
| GB | 2462452 | B | 2/2011 | |
| WO | 2001030652 | A1 | 5/2001 | |
| WO | 2010015866 | A2 | 2/2010 | |
| WO | 2015150529 | A1 | 10/2015 | |
| WO | WO-2015150529 | A1 * | 10/2015 | B08B 1/006 |

OTHER PUBLICATIONS

Dirtflare, “Ring Wing VTOL!!!,” Specifications Ring Wing VTOL!!!, Aug. 1, 2016, Retrieved from the Internet on Mar. 22, 2018: URL: https://www.simpleplanes.com/a/Mo2vSy/Ring-Wing-VTOL, pp. 1-2.
International Search Report and Written Opinion for PCT Application No. PCT/US2017/019776 dated May 10, 2017.

* cited by examiner

SIX DEGREE OF FREEDOM AERIAL VEHICLE WITH OFFSET PROPULSION MECHANISMS

CROSS-REFERENCE TO RELATED APPLICATION

This application is a Continuation-In-Part of U.S. patent application Ser. No. 15/057,919, filed Mar. 1, 2016, entitled "Six Degree Of Freedom Aerial Vehicle," which is incorporated herein by reference in its entirety.

BACKGROUND

Unmanned vehicles, such as unmanned aerial vehicles ("UAV"), ground and water based automated vehicles, are continuing to increase in use. For example, UAVs are often used by hobbyists to obtain aerial images of buildings, landscapes, etc. Likewise, unmanned ground based units are often used in materials handling facilities to autonomously transport inventory within the facility. While there are many beneficial uses of these vehicles, they also have many drawbacks. For example, due to current design limitations, unmanned aerial vehicles are typically designed for either agility or efficiency, but not both. Likewise, aerial vehicles are designed to only operate with four degrees of freedom—pitch, yaw, roll, and heave.

BRIEF DESCRIPTION OF THE DRAWINGS

The detailed description is described with reference to the accompanying figures. In the figures, the left-most digit(s) of a reference number identifies the figure in which the reference number appears.

Figure 1:
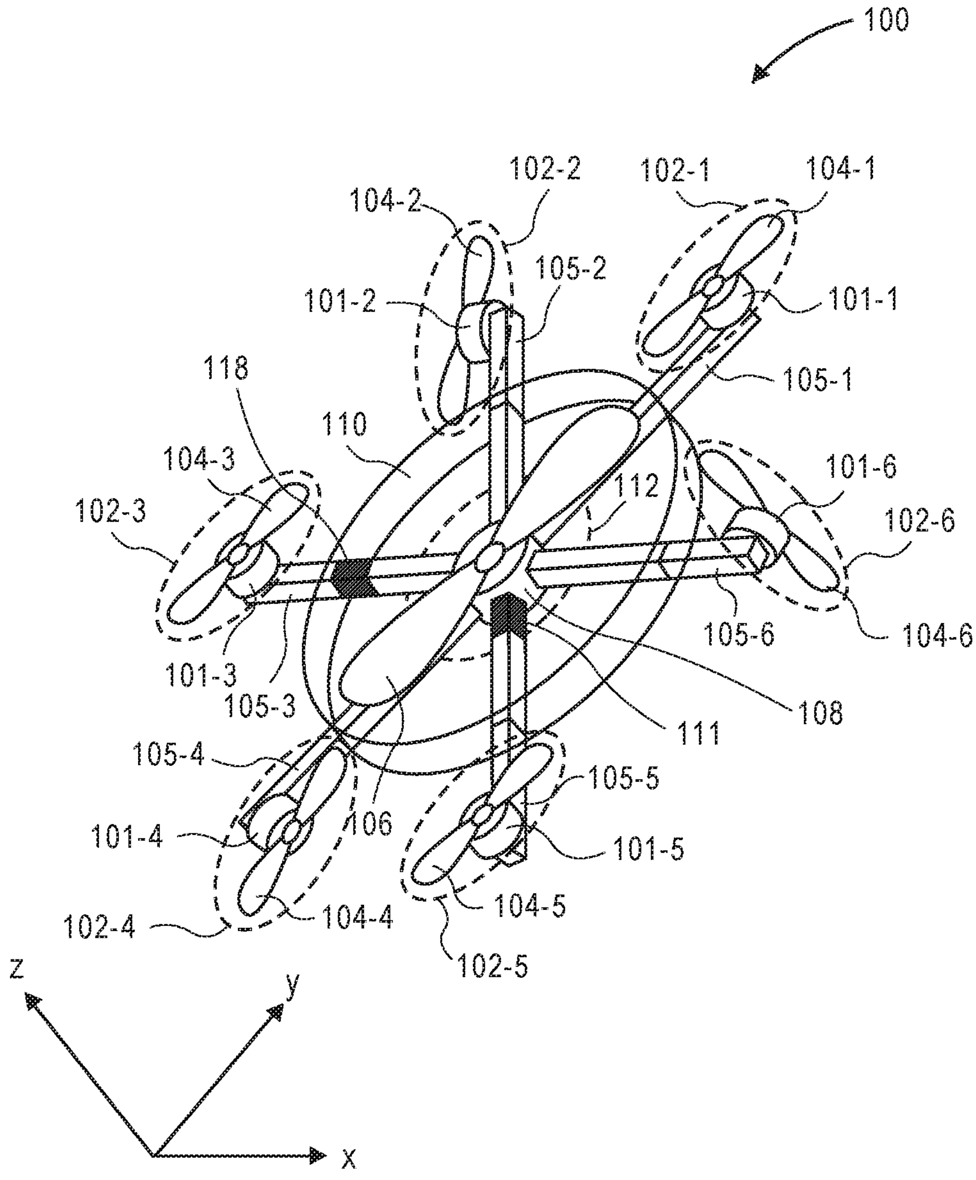
FIG. 1 depicts a diagram of an aerial vehicle, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes aerial vehicles, such as UAVs (e.g., quad-copters, hex-copters, hepta-copters, octa-copters) that operate with six degrees of freedom. Specifically, as described herein, the aerial vehicles may efficiently rotate in any of the three degrees of freedom rotation (pitch, yaw, and roll) and/or any of the three degrees of freedom translation (surge, heave, and sway). For example, the aerial vehicle may include six maneuverability propulsion mechanisms that can be independently activated to cause the aerial vehicle to move in any one or more of the six degrees of freedom. Likewise, in some implementations, the aerial vehicle may include a lifting propulsion mechanism that may be used to generate a lifting force sufficient to lift the aerial vehicle and any attached payload.

The lifting propulsion mechanism increases the efficiency of the aerial vehicle and allows the maneuverability propulsion mechanisms to operate in a wider range of rotational speeds to maneuver the aerial vehicle. For example, the lifting propulsion mechanism may be larger in size than the maneuverability propulsion mechanisms and selected based on the mass of the aerial vehicle and any anticipated payload. In one implementation, the lifting propulsion mechanism may be selected such that the lifting propulsion mechanism is operating within its most efficient range when generating a force that is approximately equal to and opposite the gravitational force applied to the aerial vehicle.

The lifting motors may be designed with larger, more efficient motors than the maneuverability motors, and the lifting propellers may have a larger diameter than the maneuverability propellers. The lifting motors and lifting propellers provide a primary purpose of providing lift and power efficiency to the aerial vehicle. For example, the lifting motors and lifting propellers may be positioned toward the center of the body of the aerial vehicle and/or at an approximate center of gravity of the aerial vehicle.

In comparison, the maneuverability motors may be configured with smaller, more agile motors, and the maneuverability propellers may be smaller propellers designed for providing high agility and maneuverability for the aerial vehicle. The maneuverability motors provide a primary purpose of maneuvering the aerial vehicle and providing high agility when needed.

During transport, aerial vehicles often must maneuver to change course, avoid obstacles, navigate, ascend, descend, etc. For example, when an aerial vehicle is landing, taking off, or in an area with many objects (e.g., a dense area such as a neighborhood, street, etc.), the aerial vehicle must maneuver as it aerially navigates through the area. Current aerial vehicles, such as quad-copters or octa-copters, are restrained to four degrees of freedom (pitch, yaw, roll, and heave). If the aerial vehicle is commanded to surge and/or sway, it must utilize one or more of the four degrees (pitch, yaw, roll, and heave) to perform the commanded maneuver. For example, if the aerial vehicle is commanded to surge forward, the aerial vehicle must pitch forward so that the thrust from the propulsion mechanisms provide both lift and thrust to propel the aerial vehicle forward.

The propulsion mechanisms described herein, in addition to being able to lift the aerial vehicle and cause the aerial vehicle to move in any of the six degrees of freedom, enable the aerial vehicle to be aerially navigated in any direction and with any orientation.

As used herein, a "materials handling facility" may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. A "delivery location," as used herein, refers to any location at which one or more inventory items (also referred to herein as a payload) may be delivered. For example, the delivery location may be a person's residence, a place of business, a location within a materials handling facility (e.g., packing station, inventory storage), or any location where a user or inventory is located, etc. Inventory or items may be any physical goods that can be transported using an aerial vehicle. For example, an item carried by a payload of an aerial vehicle discussed herein may be ordered by a customer of an electronic commerce website and aerially delivered by the aerial vehicle to a delivery location.

FIG. 1 illustrates a view of an aerial vehicle 100, according to an implementation. The aerial vehicle 100 includes six maneuverability motors 101-1, 101-2, 101-3, 101-4, 101-5, and 101-6 and corresponding maneuverability propellers 104-1, 104-2, 104-3, 104-4, 104-5, and 104-6 spaced about the body of the aerial vehicle 100. The propellers 104 may be any form of propeller (e.g., graphite, carbon fiber) and of any size. For example, the maneuverability propellers may be 10 inch-12 inch diameter carbon fiber propellers.

The form and/or size of some of the maneuverability propellers may be different than other maneuverability propellers. Likewise, the maneuverability motors 101 may be any form of motor, such as a direct current ("DC") brushless motor, and may be of a size sufficient to rotate the corresponding maneuverability propeller. Likewise, in some implementations, the size and/or type of some of the maneuverability motors 101 may be different than other maneuverability motors 101. In some implementations, the maneuverability motors may be rotated in either direction such that the force generated by the maneuverability propellers may be either a positive force, when rotating in a first direction, or a negative force, when rotating in the second direction. Alternatively, or in addition thereto, the pitch of the blades of a maneuverability propeller may be variable. By varying the pitch of the blades, the force generated by the maneuverability propeller may be altered to either be in a positive direction or a negative direction.

Each pair of maneuverability motors 101 and corresponding maneuverability propeller will be referred to herein collectively as a maneuverability propulsion mechanism 102, such as maneuverability propulsion mechanisms 102-1, 102-2, 102-3, 102-4, 102-5, and 102-6. Likewise, while the example illustrated in FIG. 1 describes the maneuverability propulsion mechanisms 102 as including maneuverability motors 101 and maneuverability propellers 104, in other implementations, other forms of propulsion may be utilized as the maneuverability propulsion mechanisms 102. For example, one or more of the maneuverability propulsion mechanisms 102 of the aerial vehicle 100 may utilize fans, jets, turbojets, turbo fans, jet engines, and/or the like to maneuver the aerial vehicle. Generally described, a maneuverability propulsion mechanism 102, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 102-1, 102-2, 102-3, 102-4, 102-5, and 102-6) may be configured such that their individual orientations may be dynamically modified (e.g., change from vertical to horizontal orientation). For example, if the aerial vehicle is navigating in a horizontal direction, one or more of the propulsion mechanisms 102-1, 102-3, 102-5 may alter orientation to provide horizontal thrust to propel the aerial vehicle horizontally. Likewise, one or more of the propulsion mechanisms may be oriented in other directions to provide thrust for other navigation maneuvers.

Likewise, while the examples herein describe the propulsion mechanisms being able to generate force in either direction, in some implementations, the maneuverability mechanisms may only generate force in a single direction. However, the orientation of the maneuverability mechanism may be adjusted so that the force can be oriented in a positive direction, a negative direction, and/or any other direction.

As illustrated, the maneuverability propulsion mechanisms 102 may be oriented at different angles. As illustrated in FIG. 1, maneuverability propulsion mechanisms 102-1, 102-3, and 102-5 are oriented in approximately the same direction as the lifting propulsion mechanism such that forces generated by each of the maneuverability propulsion mechanisms 102-1, 102-3, 102-5 are approximately parallel to forces generated by the lifting propulsion mechanism. Maneuverability propulsion mechanisms 102-2, 102-4, and 102-6 are oriented at approximately perpendicular to the lifting propulsion mechanism so that forces generated by the maneuverability propulsion mechanisms 102-2, 102-4, 102-6 are approximately perpendicular to forces generated by the lifting propulsion mechanism and the maneuverability propulsion mechanisms 102-1, 102-3, and 102-5.

For ease of discussion, maneuverability propulsion mechanisms that are aligned such that they generate forces that are approximately parallel with forces generated by the lifting propulsion mechanism will be referred to as vertically aligned maneuverability propulsion mechanisms. Maneuverability propulsion mechanisms that are aligned such that they generate forces that are approximately perpendicular to forces generated by the lifting propulsion mechanism will be referred to herein as horizontally aligned maneuverability propulsion mechanisms.

In this example, each of the maneuverability propulsion mechanisms 102 are positioned in approximately the same plane, in this example the X-Y plane, and spaced approximately sixty degrees from each other, such that the maneuverability propulsion mechanisms 102 are positioned at approximately equal distances with respect to one another and around the perimeter of the aerial vehicle 100. However, in other implementations, the spacing between the maneuverability propulsion mechanisms may be different. For example, the vertically aligned maneuverability propulsion mechanisms 102-1, 102-3, and 102-5 may each be approximately equally spaced 120 degrees apart and each of the horizontally aligned maneuverability propulsion mechanisms 102-2, 102-4, and 102-6 may also be approximately equally spaced 120 degrees apart. However, the spacing between the vertically aligned maneuverability propulsion mechanisms and the horizontally aligned maneuverability propulsion mechanisms may not be equal. For example, the vertically aligned maneuverability propulsion mechanisms 102-1, 102-3, and 102-5 may be positioned at approximately zero degrees, approximately 120 degrees, and approximately 240 degrees, and the horizontally aligned maneuverability propulsion mechanisms may be positioned at approximately 10 degrees, approximately 130 degrees, and approximately 250 degrees.

In other implementations, the maneuverability propulsion mechanisms may have other alignments. Likewise, in other implementations, there may be fewer or additional vertically aligned maneuverability propulsion mechanisms and/or fewer or additional vertically aligned maneuverability propulsion mechanisms.

In addition to the maneuverability propulsion mechanisms 102, the aerial vehicle 100 may also include one or more lifting motors 108 and corresponding lifting propellers 106. The lifting motor and corresponding lifting propeller are of a size and configuration to generate a force that will lift the aerial vehicle and any engaged payload such that the aerial vehicle can aerially navigate. For example, the lifting propeller may be a 29 inch-32 inch diameter carbon fiber propeller.

In some implementations, the lifting motor 108 and corresponding lifting propeller 106 may be sized such that they are capable of generating a force that is approximately equal and opposite to the gravitational force applied to the aerial vehicle 100. For example, if the mass of the aerial vehicle, without a payload, is 20.00 kilograms (kg), the gravitational force acting on the aerial vehicle is 196.20 Newtons (N). If the aerial vehicle is designed to carry a payload having a mass between 0.00 kg and 8.00 kg, the lifting motor and lifting propeller may be selected such that, when generating a force between 196.00 N and 275.00 N, the lifting motor is operating in its most power efficient range.

Additional information regarding aerial vehicles that include a lifting propeller, lifting motor, maneuverability propellers, and maneuverability motors can be found in co-pending U.S. Pat. No. 10,011,353, filed Feb. 2, 2015, and titled "MANEUVERING AN UNMANNED AERIAL VEHICLE WITHOUT CONSIDERING THE EFFECTS OF GRAVITY," the contents of which are herein incorporated by reference in their entirety.

Each lifting motor 108 and corresponding lifting propeller 106 will be referred to herein collectively as a lifting propulsion mechanism. Likewise, while the example illustrated in FIG. 1 describes the lifting propulsion mechanism as including a lifting motor 108 and lifting propeller 106, in other implementations, other forms of propulsion may be utilized as the lifting propulsion mechanisms. For example, one or more of the lifting propulsion mechanisms of the aerial vehicle may utilize fans, jets, turbojets, turbo fans, jet engines, and/or the like to lift the aerial vehicle. Generally described, a lifting propulsion mechanism, as used herein, includes any form of propulsion mechanism that is capable of generating a force sufficient to lift the aerial vehicle and any attached payload, alone and/or in combination with other propulsion mechanisms.

To counteract the angle of momentum of the lifting propeller 106, one or more of the maneuverability propellers 104 may rotate in a direction opposite that of the lifting propeller 106 to keep the aerial vehicle 100 from rotating with the rotation of the lifting propeller 106.

The body or housing of the aerial vehicle 100 may likewise be of any suitable material, such as graphite, carbon fiber, and/or aluminum. In this example, the body of the aerial vehicle 100 includes a perimeter shroud 110 that surrounds the lifting propeller 106 and six arms 105-1, 105-2, 105-3, 105-4, 105-5, and 105-6 that extend radially from a central portion of the aerial vehicle. In this example, each of the arms are coupled to and form the central portion and the lifting motor 108 is also mounted to the central portion. Coupled to the opposing ends of the arms 105-1, 105-2, 105-3, 105-4, 105-5, and 105-6 are the maneuverability propulsion mechanisms 102, discussed above. Also, as discussed above, the spacing between the different maneuverability propulsion mechanisms may be altered by altering a position of one or more of the arms 105 extending from the central portion of the aerial vehicle 100.

While the implementation illustrated in FIG. 1 includes six arms 105 that extend radially from a central portion of the aerial vehicle 100 to form the frame or body of the aerial vehicle, in other implementations, there may be fewer or additional arms. For example, the aerial vehicle may include support arms that extend between the arms 105 and provide additional support to the aerial vehicle and/or to support the payload engagement mechanism 112. The arms 105, shroud 110, and/or payload engagement mechanism 112 of the aerial vehicle may be formed of any type of material, including, but not limited to, graphite, carbon fiber, aluminum, titanium, Kevlar, etc.

As discussed, in the illustrated configuration of the aerial vehicle 100, three of the maneuverability propulsion mechanisms 102-1, 102-3, and 102-5 are vertically aligned and three of the maneuverability propulsion mechanisms 102-2, 102-4, and 102-6 are horizontally aligned. With such a configuration, the aerial vehicle 100 can be aerially navigated in any direction and with any orientation.

For example, the aerial vehicle 100 may navigate with the heading and direction described with respect to FIGS. 2-7 in which the maneuverability propulsion mechanism 102-6 is indicated as being in the direction of the heading and the aerial vehicle 100 oriented such that the lifting propulsion mechanism and maneuverability propulsion mechanisms 102-1, 102-3, and 102-5 are oriented to generate vertical forces that are opposite the gravitational force acting on the aerial vehicle. However, in other implementations, the aerial vehicle may be aerially navigated with any other heading. Likewise, the aerial vehicle may have any orientation. For example, the aerial vehicle could be vertically oriented such that the lifting propulsion mechanism is aligned substantially perpendicular to the force of gravity acting on the vehicle. In such an orientation, the lifting propulsion mechanism and/or the maneuverability propulsion mechanisms 102-1, 102-3, and 102-5, when generating forces, will generate forces that are approximately perpendicular to the force of gravity acting on the aerial vehicle 100. Likewise, the maneuverability propulsion mechanisms 102-2, 102-4, and 102-6 may be used to generate forces that are opposite the force of gravity acting on the vehicle to maintain an altitude of the aerial vehicle. At other orientations, one or more combinations of the lifting propulsion mechanism and/or the maneuverability propulsion mechanisms may be used to generate lifting forces to maintain the aerial vehicle at an altitude and to generate other forces to aerially maneuver the aerial vehicle 100.

In some implementations, the payload engagement mechanism 112 may be coupled to one or more of the arms 105 and be configured to selectively engage and/or disengage a payload. Also coupled to and/or included within one or more of the arms 105 is an aerial vehicle control system 111 and one or more power modules 118, such as a battery. In this example, the aerial vehicle control system 111 is mounted inside arm 105-5 and the power module 118 is mounted to the arm 105-3. The aerial vehicle control system 111, as discussed in further detail below with respect to FIG. 16, controls the operation, routing, navigation, communication, lifting motor control, maneuverability motor controls, and/or the payload engagement mechanism 112 of the aerial vehicle 100.

The power module(s) 118 may be removably mounted to the aerial vehicle 100. The power module(s) 118 for the aerial vehicle may be in the form of battery power, solar power, gas power, super capacitor, fuel cell, alternative power generation source, or a combination thereof. The power module(s) 118 are coupled to and provide power for the aerial vehicle control system 111, the propulsion mechanisms, and the payload engagement mechanism.

In some implementations, one or more of the power modules may be configured such that it can be autonomously removed and/or replaced with another power module. For example, when the aerial vehicle lands at a delivery location, relay location and/or materials handling facility, the aerial vehicle may engage with a charging member at the location that will recharge the power module.

As mentioned above, the aerial vehicle 100 may also include a payload engagement mechanism 112. The payload engagement mechanism may be configured to engage and disengage items and/or containers that hold items. In this example, the payload engagement mechanism is positioned beneath the body of the aerial vehicle 100. The payload engagement mechanism 112 may be of any size sufficient to securely engage and disengage items and/or containers that contain items. In other implementations, the payload engagement mechanism may operate as the container, containing the item(s). The payload engagement mechanism communicates with (via wired or wireless communication) and is controlled by the aerial vehicle control system 111.

Figure 5:
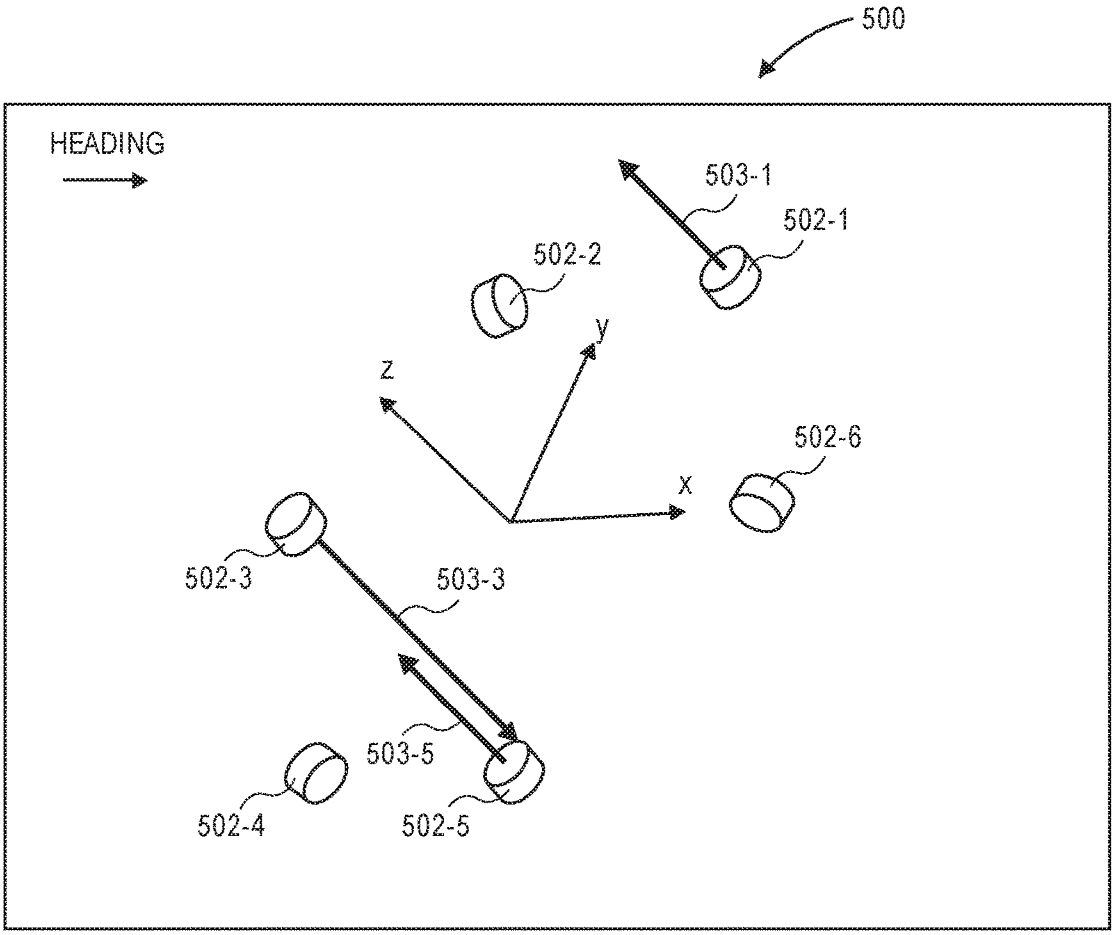
FIG. 5 is a diagram of the propulsion mechanism of the aerial vehicle illustrated in FIG. 1 with thrust vectors to cause the aerial vehicle to pitch, according to an implementation.
Figure 6:
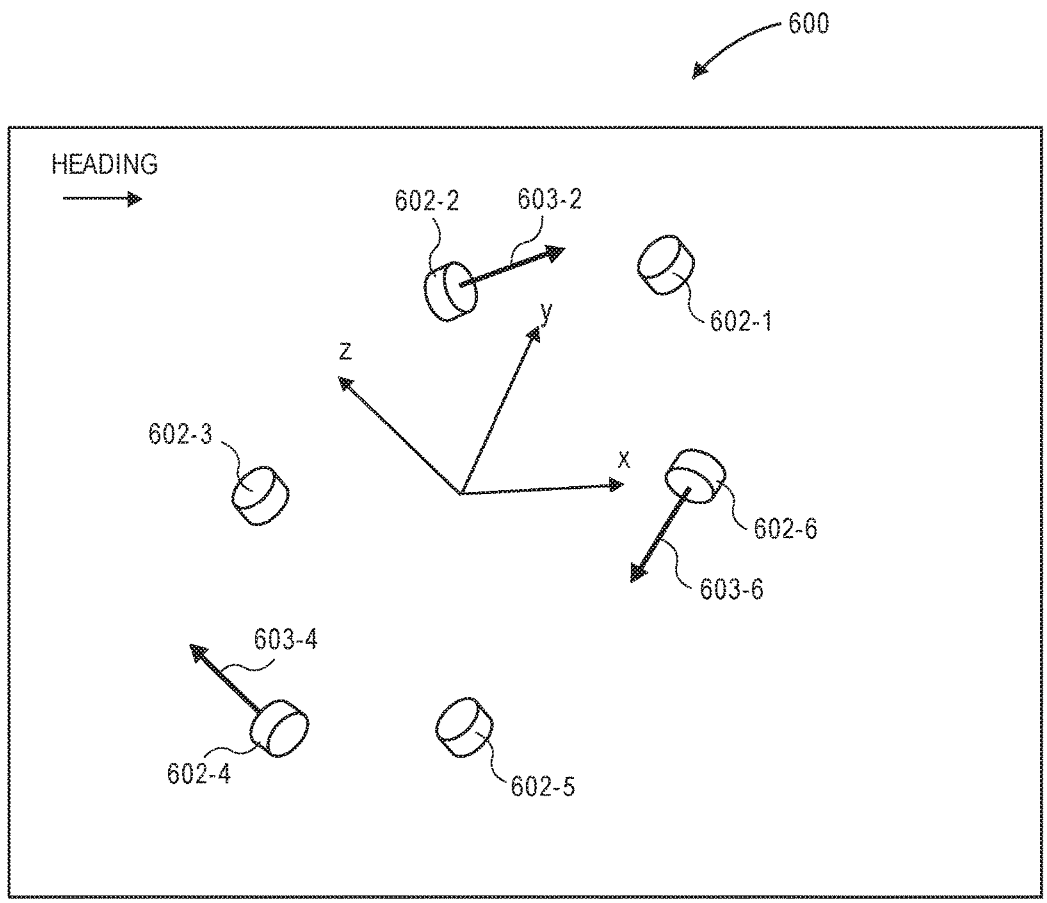
FIG. 6 is a diagram of the maneuverability propulsion mechanisms of the aerial vehicle illustrated in FIG. 1 with thrust vectors to cause the aerial vehicle to yaw, according to an implementation.
Figure 7:
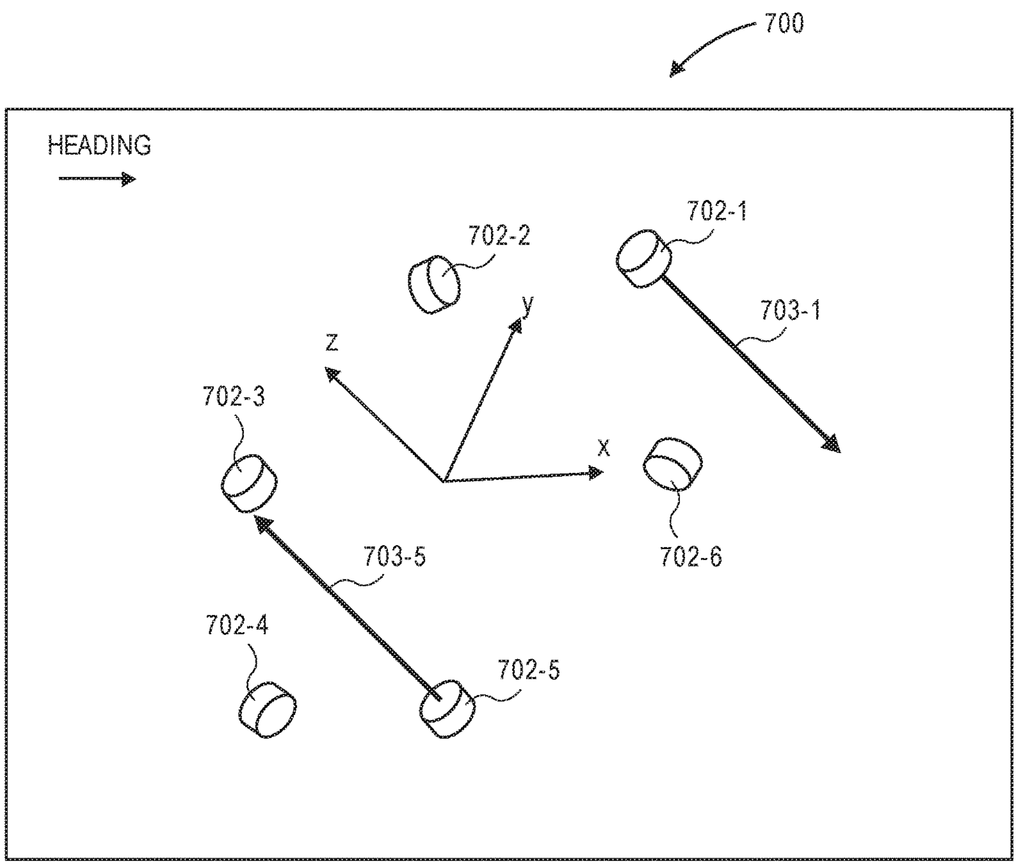
FIG. 7 is a diagram of the maneuverability propulsion mechanisms of the aerial vehicle illustrated in FIG. 1 with thrust vectors to cause the aerial vehicle to roll, according to an implementation.

FIGS. 2-7 are diagrams of the maneuverability propulsion mechanisms of the aerial vehicle illustrated in FIG. 1. To aid in explanation, other components of the aerial vehicle have been omitted from FIGS. 2-7 and different forces that may be generated by one or more of the maneuverability propulsion mechanisms are illustrated by vectors. The illustrated forces, when generated, will cause the aerial vehicle to surge (FIG. 2), sway (FIG. 3), heave (FIG. 4), pitch (FIG. 5), yaw (FIG. 6), and roll (FIG. 7). In addition to the forces generated by one or more of the maneuverability propulsion mechanisms, the aerial vehicle may be lifted by forces generated by the lifting propulsion mechanism discussed above and illustrated in FIG. 1. For example, the lifting propulsion mechanism may be used to generate a force that is approximately equal to and opposite the force acting upon the aerial vehicle due to gravity so that the aerial vehicle will remain at a given altitude. The maneuverability propulsion mechanisms may then be used, as discussed, to cause the aerial vehicle to move in one or more of the six degrees of freedom.

Figure 2:
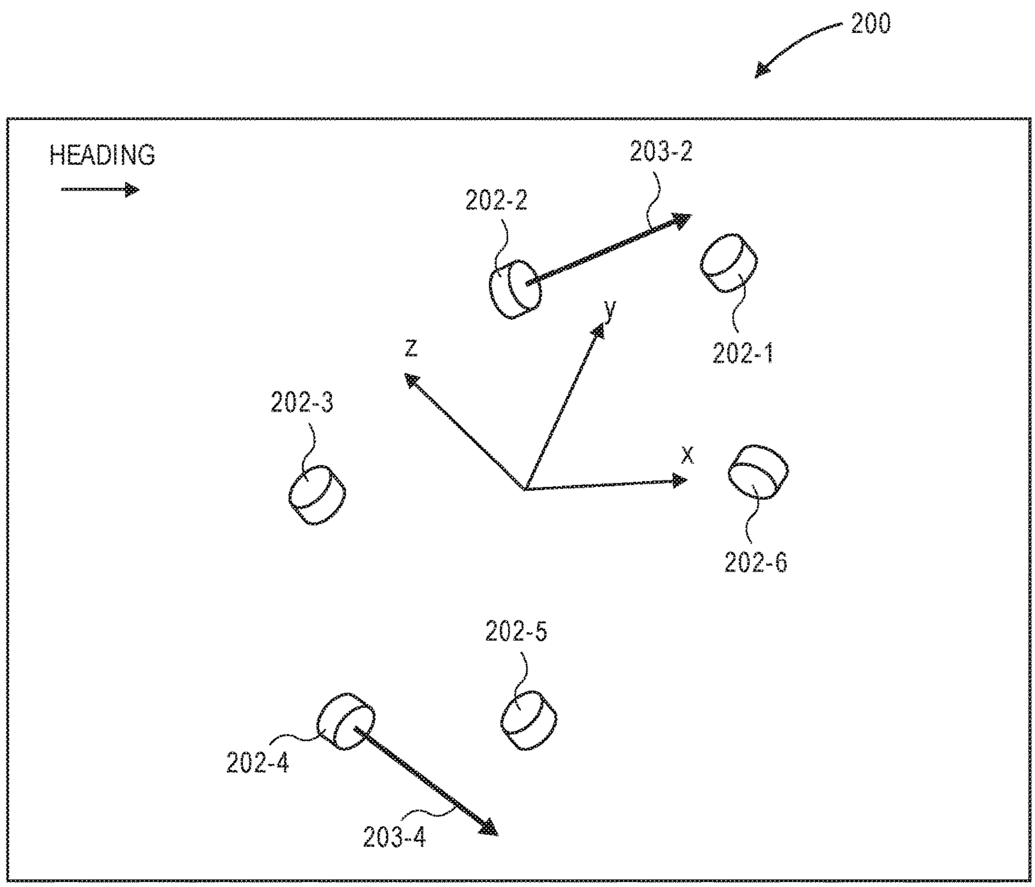
FIG. 2 is a diagram of the maneuverability propulsion mechanisms of the aerial vehicle illustrated in FIG. 1 with thrust vectors to cause the aerial vehicle to surge in the X direction, according to an implementation.

FIG. 2 is a diagram of the maneuverability propulsion mechanisms 202 of the aerial vehicle illustrated in FIG. 1 with thrust vectors 203 to cause the aerial vehicle to surge in the X direction, according to an implementation. The maneuverability propulsion mechanisms 202 illustrated in FIG. 2 correspond to the maneuverability propulsion mechanisms illustrated in FIG. 1. As discussed above, each of the maneuverability propulsion mechanisms 202 are approximately in the same plane, in this example, the X-Y plane. Likewise, while the aerial vehicle may navigate in any direction, FIG. 2 indicates a heading of the aerial vehicle 200.

In the configuration of the aerial vehicle 200, to cause the aerial vehicle 200 to surge in the X direction, horizontally aligned maneuverability propulsion mechanisms 202-2 and 202-4 generate forces that are approximately equal in magnitude. Each of the forces 203-2 and 203-4 have an X component and a Y component. The Y components of the forces 203-2 and 203-4 cancel each other out and the X components of the forces 203-2 and 203-4 combine to cause the aerial vehicle 200 to surge in the X direction consistent with the heading of the aerial vehicle 200.

If no other movement of the aerial vehicle is commanded, the other maneuverability propulsion mechanisms 202-1, 202-3, 202-5, and 202-6 may not generate any force. If other movements are commanded in addition to a surge in the X direction, one or more of the other maneuverability propulsion mechanisms 202 may likewise generate a force and/or one of the forces 203-2 or 203-4 may be greater or less, thereby causing the aerial vehicle to yaw about the Z axis.

Figure 3:
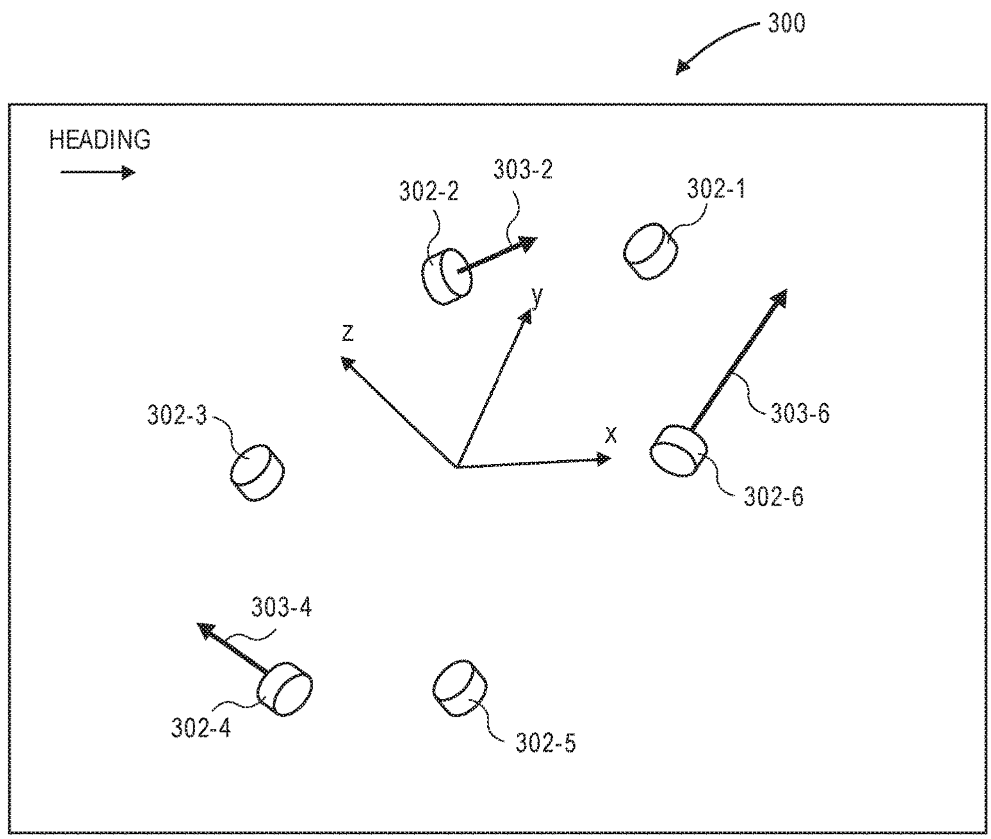
FIG. 3 is a diagram of the maneuverability propulsion mechanisms of the aerial vehicle illustrated in FIG. 1 with thrust vectors to cause the aerial vehicle to sway in the Y direction, according to an implementation.

FIG. 3 is a diagram of the maneuverability propulsion mechanisms of the aerial vehicle illustrated in FIG. 1 with thrust vectors to cause the aerial vehicle to sway in the Y direction, according to an implementation. The maneuverability propulsion mechanisms 302 illustrated in FIG. 3 correspond to the maneuverability propulsion mechanisms illustrated in FIG. 1. As discussed above, each of the maneuverability propulsion mechanisms 302 are approximately in the same plane, in this example, the X-Y plane. Likewise, while the aerial vehicle may navigate in any direction, FIG. 3 indicates a heading of the aerial vehicle 300.

In the configuration of the aerial vehicle 300, to cause the aerial vehicle 300 to sway in the Y direction, horizontally aligned maneuverability propulsion mechanism 302-6 generates a force 303-6 in the Y direction. Likewise, maneuverability propulsion mechanisms 302-2 and 302-4 generate forces 303-2 and 303-4 that when summed have a combined force in the Y direction with a magnitude that is approximately equal to the magnitude of the force 303-6 generated by the maneuverability propulsion mechanism 302-6. Each of the forces 303-2 and 303-4 have an X component and a Y component. The X components of the forces 303-2 and 303-4 cancel each other out and the Y component of the forces 303-2 and 303-4 combine and equal the Y component of the force 303-6 to cause the aerial vehicle 300 to sway in the Y direction.

If no other movement of the aerial vehicle is commanded, the other maneuverability propulsion mechanisms 302-1, 302-3, and 302-5 may not generate any force. If other movements are commanded in addition to a sway in the Y direction, one more of the other maneuverability propulsion mechanisms 302 may likewise generate a force and/or one of the forces 303-2, 303-4, and/or 303-6 may be greater or less, thereby causing the aerial vehicle to yaw about the Z axis.

Figure 4:
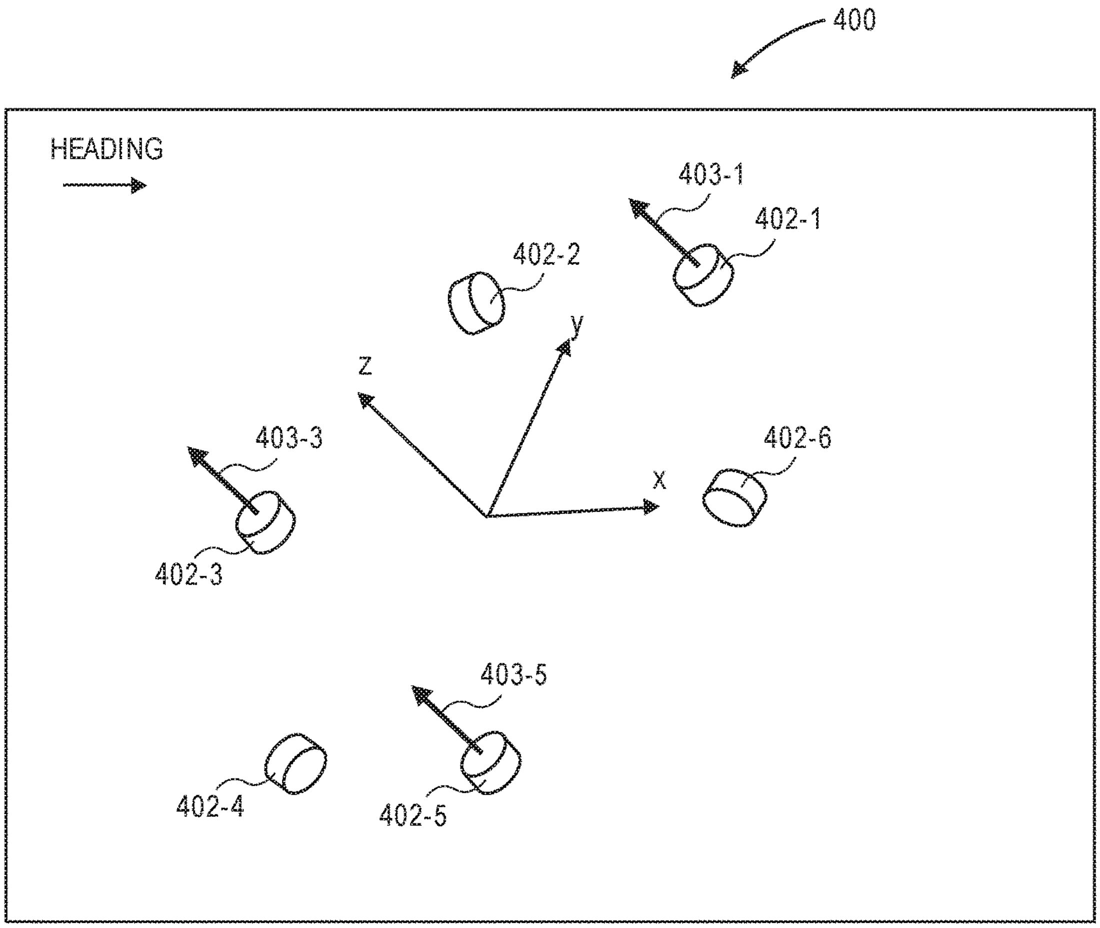
FIG. 4 is a diagram of the maneuverability propulsion mechanisms of the aerial vehicle illustrated in FIG. 1 with thrust vectors to cause the aerial vehicle to heave in the Z direction, according to an implementation.

FIG. 4 is a diagram of the maneuverability propulsion mechanisms of the aerial vehicle illustrated in FIG. 1 with thrust vectors to cause the aerial vehicle to heave in the Z direction, according to an implementation. The maneuverability propulsion mechanisms 402 illustrated in FIG. 4 correspond to the maneuverability propulsion mechanisms illustrated in FIG. 1. As discussed above, each of the maneuverability propulsion mechanisms 402 are approximately in the same plane, in this example, the X-Y plane. Likewise, while the aerial vehicle may navigate in any direction, FIG. 4 indicates a heading of the aerial vehicle 400.

In the configuration of the aerial vehicle 400, to cause the aerial vehicle 400 to heave in the Z direction, vertically aligned maneuverability propulsion mechanisms 402-1, 402-3, and 402-5 generate forces 403-1, 403-3, and 403-5 that are approximately equal and in the Z direction. Because each of the maneuverability propulsion mechanisms are vertically aligned, as discussed above, the generated forces only have a Z component.

Causing the aerial vehicle to heave in the Z direction may be used, for example, to increase or decrease the altitude of the aerial vehicle that is maintained by the lifting propulsion mechanism. For example, if the lifting propulsion mechanism is generating a force that is approximately equal to and opposite the force of gravity acting on the aerial vehicle 400 and the vertically aligned maneuverability propulsion mechanisms generate a positive vertical force, as illustrated in FIG. 4, the altitude of the aerial vehicle will increase because the total force acting on the vehicle as a result of the lifting propulsion mechanism and the forces 403-1, 403-3, and 403-5 are greater than the gravitational force acting on the aerial vehicle. Similarly, if the lifting propulsion mechanism is generating a force that is approximately equal to and opposite the force of gravity acting on the aerial vehicle 400 and the vertically aligned maneuverability propulsion mechanisms 402-1, 402-3, and 402-5 generate a negative vertical force, the altitude of the aerial vehicle will decrease because the total force acting on the aerial vehicle as a result of the negative vertical force and the force of gravity acting on the aerial vehicle is greater than the force generated by the lifting propulsion mechanism.

If no other movement of the aerial vehicle is commanded, the other maneuverability propulsion mechanisms 402-2, 402-4, and 402-6 may not generate any force. If other movements are commanded in addition to a heave in the Z direction, one or more of the other maneuverability propulsion mechanisms 402 may likewise generate a force and/or one of the forces 403-1, 403-3, or 403-5 may be greater or less, thereby causing the aerial vehicle to pitch and/or roll.

FIG. 5 is a diagram of the maneuverability propulsion mechanisms 502 of the aerial vehicle illustrated in FIG. 1 with thrust vectors 503 to cause the aerial vehicle to pitch about the Y axis, according to an implementation. The maneuverability propulsion mechanisms 502 illustrated in FIG. 5 correspond to the maneuverability propulsion mechanisms illustrated in FIG. 1. As discussed above, each of the maneuverability propulsion mechanisms 502 are approximately in the same plane, in this example, the X-Y plane. Likewise, while the aerial vehicle may navigate in any direction, FIG. 5 indicates a heading of the aerial vehicle 500.

In the configuration of the aerial vehicle 500, to cause the aerial vehicle 500 to pitch such that the portion of the aerial vehicle aligned toward the indicated heading moves in the positive Z direction, vertically aligned maneuverability propulsion mechanisms 502-1, 502-3, and 502-5 generate forces in the Z direction. Specifically, maneuverability propulsion mechanisms 502-1 and 502-5 generate vertical forces 503-1 and 503-5 that approximately equal in magnitude and maneuverability propulsion mechanism 502-3 generates a force that is approximately twice the magnitude as either force 503-1 or 503-5. The forces 503-1 and 503-5 are in the positive Z direction and force 503-3 is in the negative Z direction. Summing the forces 503-1, 503-3, and 503-5 results in a rotational force or moment that causes the aerial vehicle to pitch about the Y axis such that the portion of the aerial vehicle aligned toward the heading moves in the positive Z direction.

If no other movement of the aerial vehicle is commanded, the other maneuverability propulsion mechanisms 502-2, 502-4, and 502-6 may not generate any force. If other movements are commanded in addition to a pitch, one more of the other maneuverability propulsion mechanisms 502 may likewise generate a force and/or one of the forces 503-1 or 503-5 may be greater or less, thereby causing the aerial vehicle to roll.

FIG. 6 is a diagram of the maneuverability propulsion mechanisms of the aerial vehicle illustrated in FIG. 1 with thrust vectors to cause the aerial vehicle to yaw about the Z axis, according to an implementation. The maneuverability propulsion mechanisms 603 illustrated in FIG. 6 correspond to the maneuverability propulsion mechanisms illustrated in FIG. 1. As discussed above, each of the maneuverability propulsion mechanisms 602 are approximately in the same plane, in this example, the X-Y plane. Likewise, while the aerial vehicle may navigate in any direction, FIG. 6 indicates a heading of the aerial vehicle 600.

In the configuration of the aerial vehicle 600, to cause the aerial vehicle 600 to yaw, horizontally aligned maneuverability propulsion mechanisms 602-2, 602-4, and 602-6 generate forces that are approximately equal in magnitude. The force 603-6 only includes a Y component because of the alignment of the maneuverability propulsion mechanism 602-6. Forces 603-2 and 603-4 each have an X component and a Y component. However, because of the alignment of the maneuverability propulsion mechanisms 602-2, 602-4, the X components of the two forces 603-2, 603-4 cancel each other out. The resulting forces in the Y direction cause the aerial vehicle 600 to yaw about the Z axis.

If no other movement of the aerial vehicle is commanded, the other maneuverability propulsion mechanisms 602-1, 602-3, and 602-5 may not generate any force. If other movements are commanded in addition to a yaw, one more of the other maneuverability propulsion mechanisms 602 may likewise generate a force and/or one of the forces 603-2, 603-4, or 603-6 may be greater or less, thereby causing the aerial vehicle to sway and/or surge.

FIG. 7 is a diagram of the maneuverability propulsion mechanisms of the aerial vehicle illustrated in FIG. 1 with thrust vectors to cause the aerial vehicle to roll about the X axis, according to an implementation. The maneuverability propulsion mechanisms 703 illustrated in FIG. 7 correspond to the maneuverability propulsion mechanisms illustrated in FIG. 1. As discussed above, each of the maneuverability propulsion mechanisms 702 are approximately in the same plane, in this example, the X-Y plane. Likewise, while the aerial vehicle may navigate in any direction, FIG. 7 indicates a heading of the aerial vehicle 700.

In the configuration of the aerial vehicle 700, to cause the aerial vehicle 700 to roll about the X axis, vertically aligned maneuverability propulsion mechanisms 702-1 and 702-5 generate forces 703-1 and 703-5 that are approximately equal in magnitude but opposite in direction. Because the two forces are equal and opposite in the Z direction, the combined forces will cause the aerial vehicle to roll about the X axis.

If no other movement of the aerial vehicle is commanded, the other maneuverability propulsion mechanisms 702-2, 702-3, 702-4, and 702-6 may not generate any force. If other movements are commanded in addition to a surge in the X direction, one more of the other maneuverability propulsion mechanisms 702 may likewise generate a force to cause other maneuvers by the aerial vehicle in addition to a roll.

Figure 8:
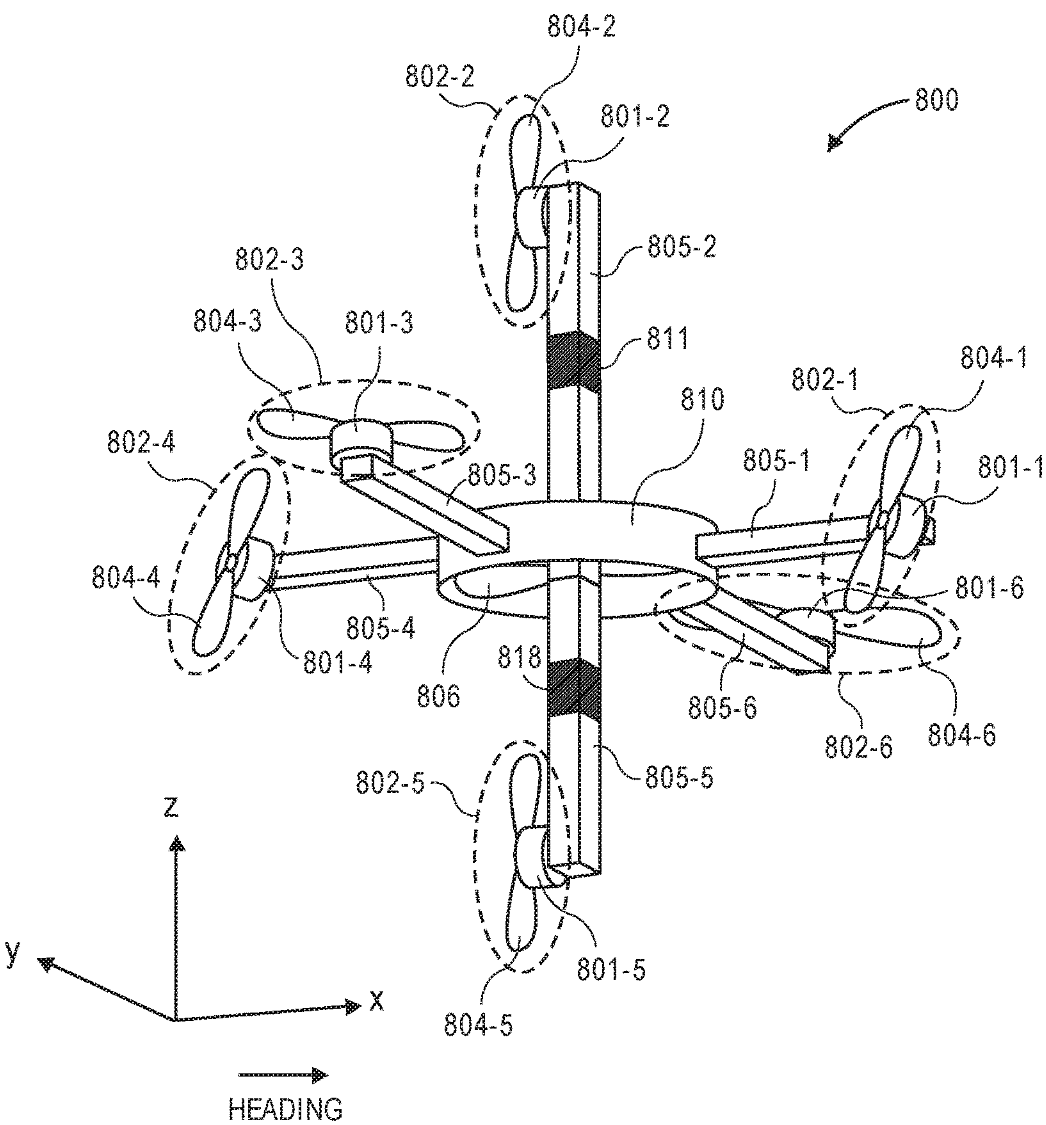
FIG. 8 depicts a diagram of an aerial vehicle, according to an implementation.

FIG. 8 illustrates a view of an aerial vehicle 800, according to an implementation. The aerial vehicle 800 includes six maneuverability motors 801-1, 801-2, 801-3, 801-4, 801-5, and 801-6 and corresponding maneuverability propellers 804-1, 804-2, 804-3, 804-4, 804-5, and 804-6 spaced about the body of the aerial vehicle 800. The propellers 804 may be any form of propeller (e.g., graphite, carbon fiber) and of any size. For example, the maneuverability propellers may be 10 inch-12 inch diameter carbon fiber propellers.

The form and/or size of some of the maneuverability propellers may be different than other maneuverability propellers. Likewise, the maneuverability motors 801 may be any form of motor, such as a direct current ("DC") brushless motor, and may be of a size sufficient to rotate the corresponding maneuverability propeller. Likewise, in some implementations, the size and/or type of some of the maneuverability motors 801 may be different than other maneuverability motors 801. In some implementations, the maneuverability motors may be rotated in either direction such that the force generated by the maneuverability propellers may be either a positive force, when rotating in a first direction, or a negative force, when rotating in the second direction.

Each pair of maneuverability motor 801 and corresponding maneuverability propeller will be referred to herein collectively as a maneuverability propulsion mechanism 802, such as maneuverability propulsion mechanisms 802-1, 802-2, 802-3, 802-4, 802-5, and 802-6. Likewise, while the example illustrated in FIG. 8 describes the maneuverability propulsion mechanisms 802 as including maneuverability motors 801 and maneuverability propellers 804, in other implementations, other forms of propulsion may be utilized as the maneuverability propulsion mechanisms 802. For example, one or more of the maneuverability propulsion mechanisms 802 of the aerial vehicle 800 may utilize fans, jets, turbojets, turbo fans, jet engines, and/or the like to maneuver the aerial vehicle. Generally described, a maneuverability propulsion mechanism 802, as used herein, includes any form of propulsion mechanism that is capable of generating a force sufficient to maneuver the aerial vehicle, alone and/or in combination with other propulsion mechanisms.

Likewise, while the examples herein describe the propulsion mechanisms being able to generate force in either direction, in some implementations, the maneuverability mechanisms may only generate force in a single direction. However, the orientation of the maneuverability mechanism may be adjusted so that the force can be oriented in either a positive direction, negative direction, and/or any other direction.

In comparison to the aerial vehicle discussed above with respect to FIGS. 1-7, the aerial vehicle 800 includes maneuverability propulsion mechanisms 802 that lie in different planes and extend in different directions from the center portion of the aerial vehicle 800. For example, maneuverability propulsion mechanisms 802-1, 802-3, 802-4, and 802-6 lie in the X-Y plane but maneuverability propulsion mechanisms 802-2 and 802-5 lie along the Z axis and outside of the X-Y plane. While the aerial vehicle 800 can be oriented to fly in any direction, for purposes of discussion with respect to FIGS. 8-14, we will refer to the aerial vehicle 800 as having an upper side and a heading. Specifically, the aerial vehicle 800 will be discussed as having a heading in the X direction, as illustrated by the Heading arrows in FIGS. 8-14. Likewise, the aerial vehicle will be discussed as having a top or upper side that corresponds to the Z axis. Specifically, the aerial vehicle will be described with respect to FIGS. 8-14 in a manner such that the maneuverability propulsion mechanism 802-2 will be considered to be on the top or upper side of the aerial vehicle 800 and the maneuverability propulsion mechanism 802-1 will considered to be in the front of the aerial vehicle 800.

As illustrated, in addition to some of the maneuverability propulsion mechanisms 802 being in different planes, the maneuverability propulsion mechanisms 802 may be oriented at different angles. As illustrated in FIG. 8, maneuverability propulsion mechanisms 802-3 and 802-6 are oriented in approximately the same direction as the lifting propulsion mechanism such that forces generated by each of the maneuverability propulsion mechanisms 802-3 and 802-6 are approximately parallel to forces generated by the lifting propulsion mechanism, which includes the lifting propellers 806. Maneuverability propulsion mechanisms 802-1 and 802-4 are oriented at approximately ninety degrees to the lifting propulsion mechanism so that forces generated by the maneuverability propulsion mechanisms 802-1 and 802-4 are approximately perpendicular to forces generated by the lifting propulsion mechanism and the maneuverability propulsion mechanisms 802-3 and 802-6, but in the same plane. Likewise, maneuverability propulsion mechanisms 802-2 and 802-5 are approximately perpendicular to the lifting propulsion mechanism and approximately perpendicular to the maneuverability propulsion mechanisms 802-1, 802-3, 802-4, and 802-6, and out of the X-Y plane.

For ease of discussion, maneuverability propulsion mechanisms that are aligned such that they generate forces that are approximately parallel with forces generated by the lifting propulsion mechanism will be referred to as vertically aligned maneuverability propulsion mechanisms. Maneuverability propulsion mechanisms that are aligned such that they generate forces that are approximately perpendicular to forces generated by the lifting propulsion mechanism will be referred to herein as horizontally aligned maneuverability propulsion mechanisms.

In this example, each of the maneuverability propulsion mechanisms 802 are positioned at right angles with respect to one another and extend from a central portion in a cubic manner, with each maneuverability propulsion mechanism positioned on an exterior surface of a six-sided cube, and the lifting propulsion mechanism at a central portion of the cube.

In other implementations, the maneuverability propulsion mechanisms may have other alignments. Likewise, in other implementations, there may be fewer or additional vertically aligned maneuverability propulsion mechanisms and/or fewer or additional vertically aligned maneuverability propulsion mechanisms.

In addition to the maneuverability propulsion mechanisms 802, the aerial vehicle 800 may also include one or more one lifting motors and corresponding lifting propellers 806. The lifting motor and corresponding lifting propeller are of a size and configuration to generate a force that will lift the aerial vehicle and any engaged payload such that the aerial vehicle can aerially navigate. For example, the lifting propeller may be a 12 inch-22 inch diameter carbon fiber propeller.

In some implementations, the lifting motor and corresponding lifting propeller may be sized such they are capable of generating a force that is approximately equal and opposite to the gravitational force applied to the aerial vehicle 800. For example, if the mass of the aerial vehicle, without a payload, is 90.00 kilograms (kg), the gravitational force acting on the aerial vehicle is 896.20 Newtons (N). If the aerial vehicle is designed to carry a payload having a mass between 0.00 kg and 8.00 kg, the lifting motor and lifting propeller may be selected such that when generating a force between 896.00 N and 975.00 N, the lifting motor is operating in its most power efficient range.

Each lifting motor and corresponding lifting propeller 806 will be referred to herein collectively as a lifting propulsion mechanism. Likewise, while the example illustrated in FIG. 8 describes the lifting propulsion mechanism as including a lifting motor and lifting propeller 806, in other implementations, other forms of propulsion may be utilized as the lifting propulsion mechanisms. For example, one or more of the lifting propulsion mechanisms of the aerial vehicle may utilize fans, jets, turbojets, turbo fans, jet engines, and/or the like to lift the aerial vehicle. Generally described, a lifting propulsion mechanism, as used herein, includes any form of propulsion mechanism that is capable of generating a force sufficient to lift the aerial vehicle and any attached payload, alone and/or in combination with other propulsion mechanisms.

To counteract the angle of momentum of the lifting propeller 806, one or more of the maneuverability propellers 804-6 and/or 804-3 may rotate in a direction opposite that of the lifting propeller 806 to keep the aerial vehicle 800 from rotating with the rotation of the lifting propeller 806. Alternatively, or in addition thereto, one or more of the maneuverability propulsion mechanisms 802-1 and 802-4 may generate a force that counteracts and cancels out the rotational force generated by the lifting propulsion mechanism.

The body or housing of the aerial vehicle 800 may likewise be of any suitable material, such as graphite, carbon fiber, and/or aluminum. In this example, the body of the aerial vehicle 800 includes a perimeter shroud 810 that surrounds the lifting propeller 806 and six arms 805-1, 805-2, 805-3, 805-4, 805-5, and 805-6 that extend at approximately ninety degrees with respect to each other from a central portion of the aerial vehicle 800. In this example, each of the arms are coupled to and form the central portion and the lifting motor is also mounted to the central portion. Coupled to the opposing ends of the arms 805-1, 805-2, 805-3, 805-4, 805-5, and 805-6 are the maneuverability propulsion mechanisms 802, discussed above.

While the implementation illustrated in FIG. 8 includes six arms 805 that extend from a central portion of the aerial vehicle 800 to form the frame or body of the aerial vehicle, in other implementations, there may be fewer or additional arms. For example, the aerial vehicle may include support arms that extend between the arms 805 and provide additional support to the aerial vehicle and/or to support a payload engagement mechanism. The arms 805, shroud 810, and/or payload engagement mechanism of the aerial vehicle may be formed of any type of material, including, but not limited to, graphite, carbon fiber, aluminum, titanium, Kevlar, etc.

As discussed, in the illustrated configuration of the aerial vehicle 800, two of the maneuverability propulsion mechanisms 802-3, and 802-6 are vertically aligned and four of the maneuverability propulsion mechanisms 802-1, 802-2, 802-3, and 802-5 are horizontally aligned. With such a configuration, the aerial vehicle 800 can be aerially navigated in any direction and with any orientation.

For example, the aerial vehicle 800 may navigate with the heading and direction described with respect to FIGS. 9-14 in which the maneuverability propulsion mechanism 802-1 is indicated as being in the direction of the heading and the aerial vehicle 800 oriented such that maneuverability propulsion mechanism 802-2 is considered to be at the top of the aerial vehicle 800. However, in other implementations, the aerial vehicle may be aerially navigated with any other heading. Likewise, the aerial vehicle may have any orientation. For example, the aerial vehicle could rotate in any direction oriented such that the lifting propulsion mechanism is aligned substantially perpendicular to the force of gravity acting on the vehicle. In such an orientation, the lifting propulsion mechanism and/or the maneuverability propulsion mechanisms 802-4, and 802-6, when generating forces, will generate forces that are approximately perpendicular to the force of gravity acting on the aerial vehicle 800. Likewise, the maneuverability propulsion mechanisms 802-1, 802-2, 802-3, and 802-5 may be used to generate forces that are opposite the force of gravity acting on the vehicle to maintain an altitude of the aerial vehicle. At other orientations, one or more combinations of the lifting propulsion mechanism and/or the maneuverability propulsion mechanisms may be used to generate lifting forces to maintain the aerial vehicle at an altitude and to generate other forces to aerially maneuver the aerial vehicle 800.

Coupled to and/or included within one or more of the arms 805 is an aerial vehicle control system 811 and one or more power modules 818, such as a battery. In this example, the aerial vehicle control system 811 is mounted inside arm 805-2 and the power module is mounted inside arm 805-5. The aerial vehicle control system 811, as discussed in further detail below with respect to FIG. 16, controls the operation, routing, navigation, communication, lifting motor control, maneuverability motor controls, and/or the payload engagement mechanism of the aerial vehicle 800.

The power module(s) 818 may be removably mounted to the aerial vehicle 800. The power module(s) 818 for the aerial vehicle may be in the form of battery power, solar power, gas power, super capacitor, fuel cell, alternative power generation source, or a combination thereof. The power module(s) 818 are coupled to and provide power for the aerial vehicle control system 811, the propulsion mechanisms, and the payload engagement mechanism.

In some implementations, one or more of the power modules may be configured such that it can be autonomously removed and/or replaced with another power module. For example, when the aerial vehicle lands at a delivery location, relay location and/or materials handling facility, the aerial vehicle may engage with a charging member at the location that will recharge the power module.

Figure 12:
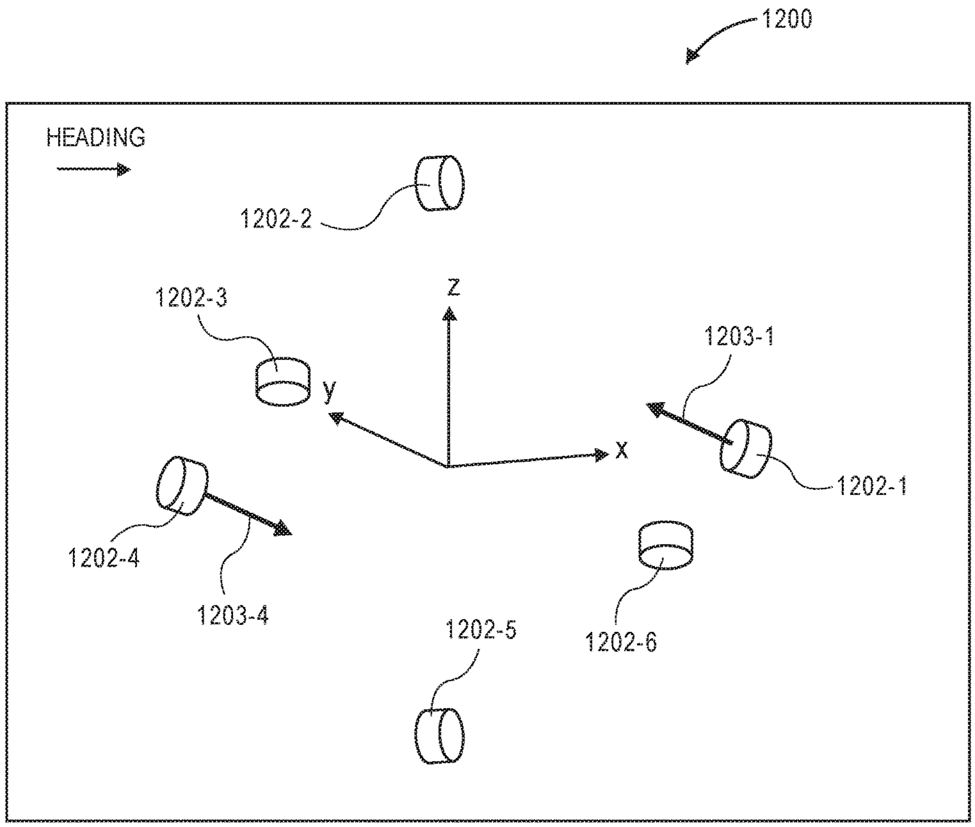
FIG. 12 is a diagram of the maneuverability propulsion mechanisms of the aerial vehicle illustrated in FIG. 8 with thrust vectors to cause the aerial vehicle to yaw, according to an implementation.
Figure 13:
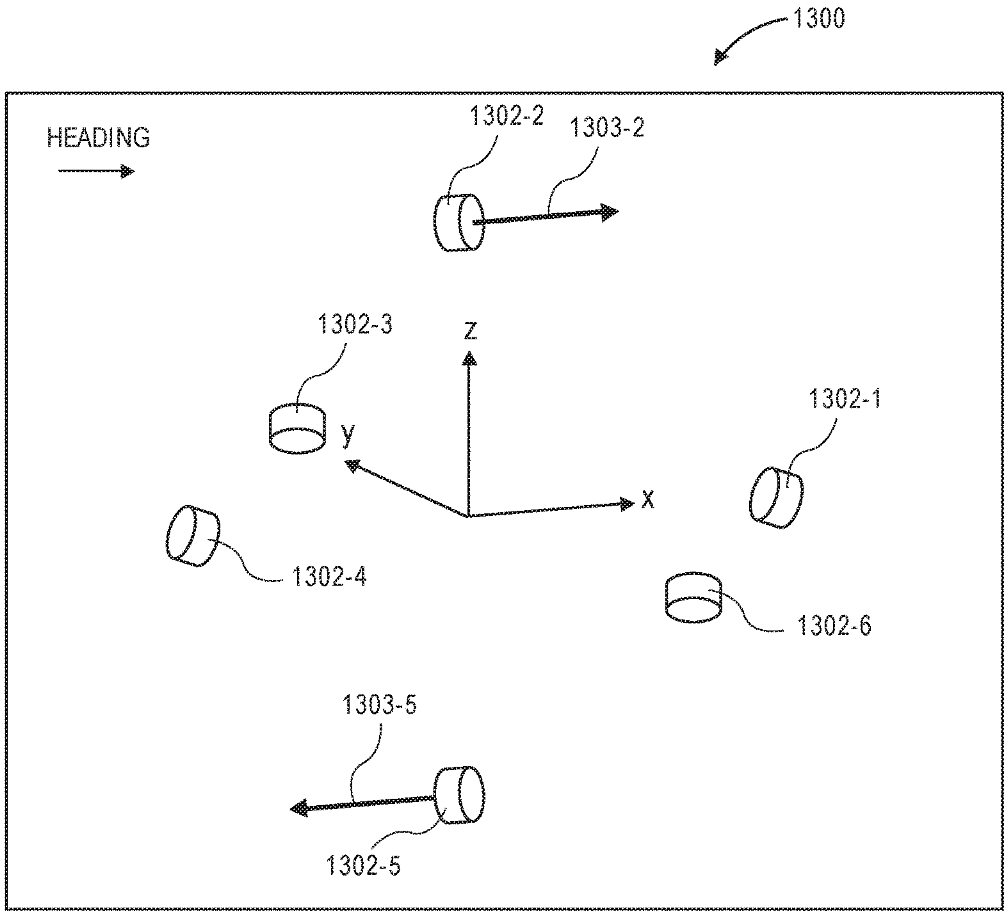
FIG. 13 is a diagram of the maneuverability propulsion mechanisms of the aerial vehicle illustrated in FIG. 8 with thrust vectors to cause the aerial vehicle to pitch, according to an implementation.
Figure 14:
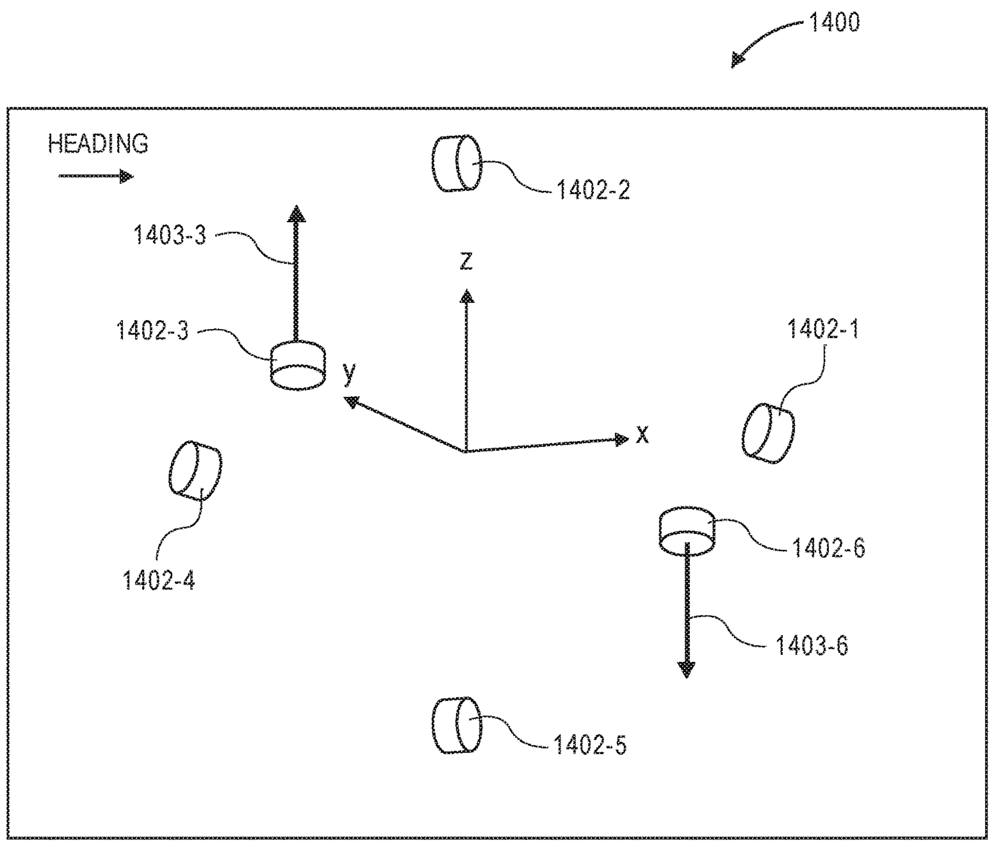
FIG. 14 is a diagram of the maneuverability propulsion mechanisms of the aerial vehicle illustrated in FIG. 8 with thrust vectors to cause the aerial vehicle to roll, according to an implementation.

FIGS. 9-14 are diagrams of the maneuverability propulsion mechanisms of the aerial vehicle illustrated in FIG. 8. To aid in explanation, other components of the aerial vehicle have been omitted from FIGS. 9-14 and different forces that may be generated by one or more of the maneuverability propulsion mechanisms are illustrated by vectors. The illustrated forces, when generated, will cause the aerial vehicle to surge (FIG. 9), heave (FIG. 10), sway (FIG. 11), yaw (FIG. 12), pitch (FIG. 13), and roll (FIG. 14). The illustrated forces, shown as vectors, are illustrated to show the direction in which the force is acting on the aerial vehicle.

In addition to the forces generated by one or more of the maneuverability propulsion mechanisms, the aerial vehicle may be lifted by forces generated by the lifting propulsion mechanism discussed above and illustrated in FIG. 8. For example, the lifting propulsion mechanism may be used to generate a force that is approximately equal to and opposite the force acting upon the aerial vehicle due to gravity so that the aerial vehicle will remain at an altitude. The maneuverability propulsion mechanisms may then be used, as discussed, to cause the aerial vehicle to move in one or more of the six degrees of freedom.

Figure 9:
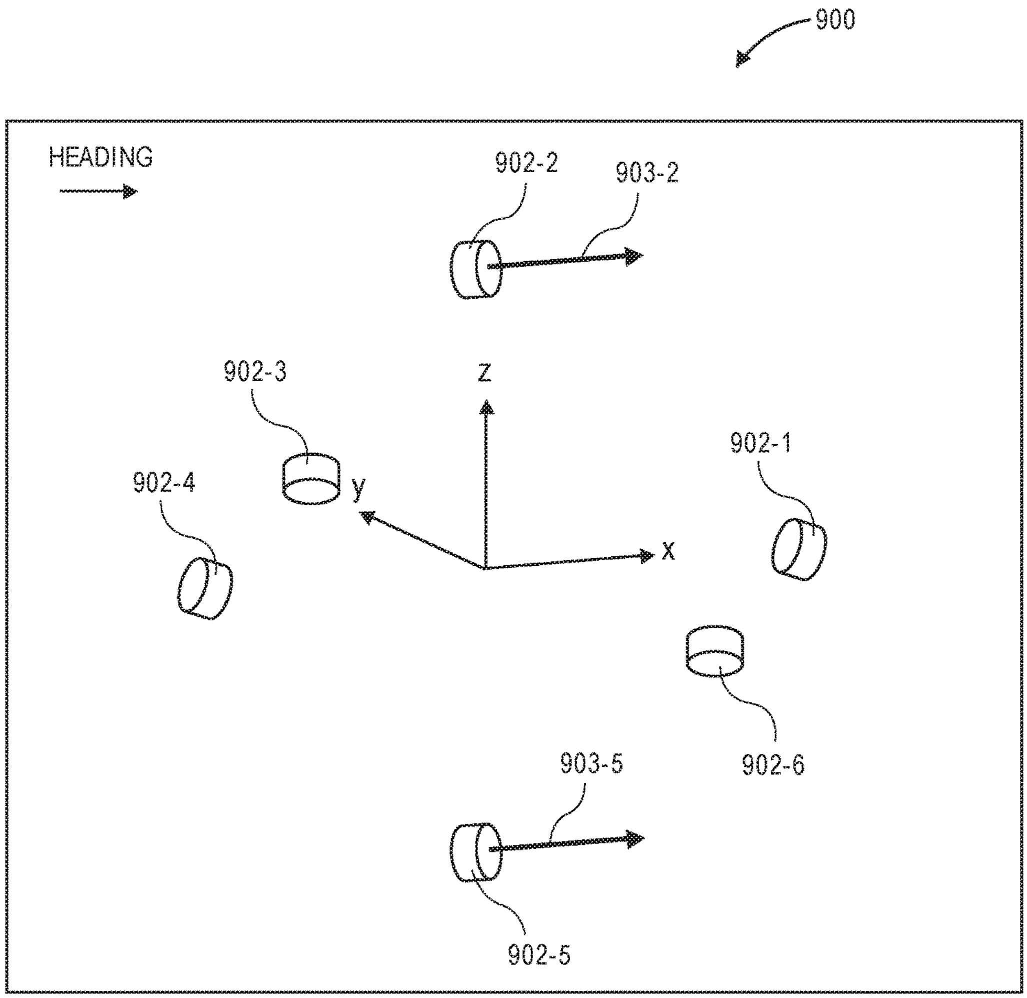
FIG. 9 is a diagram of the maneuverability propulsion mechanisms of the aerial vehicle illustrated in FIG. 8 with thrust vectors to cause the aerial vehicle to surge in the X direction, according to an implementation.

FIG. 9 is a diagram of the maneuverability propulsion mechanisms 902 of the aerial vehicle illustrated in FIG. 8 with thrust vectors 903 to cause the aerial vehicle to surge in the X direction, according to an implementation. The maneuverability propulsion mechanisms 902 illustrated in FIG. 9 correspond to the maneuverability propulsion mechanisms illustrated in FIG. 8. In this configuration, maneuverability propulsion mechanisms 902-2 and 902-5 are both horizontally aligned and oriented in the same direction such that they can be used to generate either a positive or negative force in the X direction.

In the configuration of the aerial vehicle 900, to cause the aerial vehicle 900 to surge in the X direction, horizontally aligned maneuverability propulsion mechanisms 902-2 and 902-5 generate forces that are approximately equal in magnitude and direction. Because both of the maneuverability propulsion mechanisms are aligned in the X direction, the generated forces 903-2 and 903-5 only have an X component. Those forces 903-2 and 903-5 cause the aerial vehicle 900 to surge in the X direction consistent with the heading of the aerial vehicle 900.

If no other movement of the aerial vehicle is commanded, the other maneuverability propulsion mechanisms 902-1, 902-3, 902-4, and 902-6 may not generate any force. If other movements are commanded in addition to a surge in the X direction, one or more of the other maneuverability propulsion mechanisms 902 may likewise generate a force and/or one of the forces 903-2 or 903-5 may be greater or less, thereby causing the aerial vehicle to pitch about the Y axis.

Figure 10:
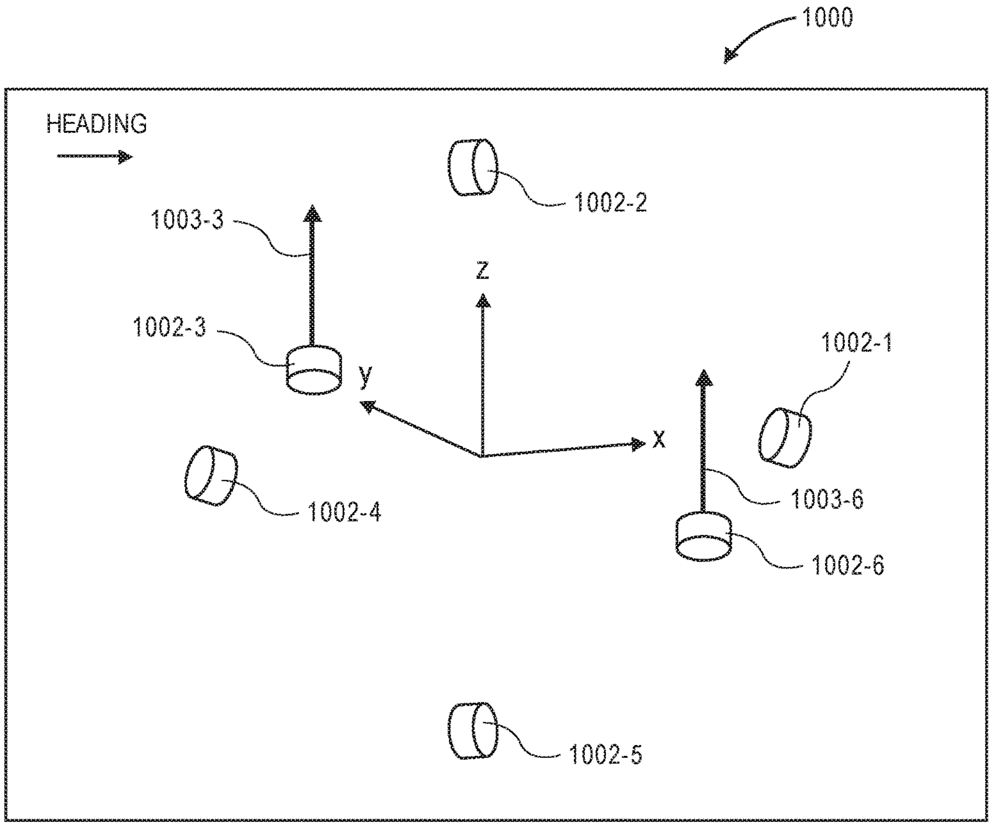
FIG. 10 is a diagram of the maneuverability propulsion mechanisms of the aerial vehicle illustrated in FIG. 8 with thrust vectors to cause the aerial vehicle to heave in the Z direction, according to an implementation.

FIG. 10 is a diagram of the maneuverability propulsion mechanisms of the aerial vehicle illustrated in FIG. 8 with thrust vectors to cause the aerial vehicle to heave in the Z direction, according to an implementation. The maneuverability propulsion mechanisms 1002 illustrated in FIG. 10 correspond to the maneuverability propulsion mechanisms illustrated in FIG. 8. In this configuration, maneuverability propulsion mechanisms 1002-3 and 1002-6 are both vertically aligned and oriented in the same direction such that they can be used to generate either a positive or negative force in the Z direction.

In the configuration of the aerial vehicle 1000, to cause the aerial vehicle 1000 to heave in the Z direction, vertically aligned maneuverability propulsion mechanisms 1002-3 and 1002-6 generate forces that are approximately equal in magnitude and direction. Because both of the maneuverability propulsion mechanisms are aligned in the Z direction, the generated forces 1003-3 and 1003-6 only have a Z component. Those forces 1003-3 and 1003-6 cause the aerial vehicle 1000 to heave in the Z direction.

Causing the aerial vehicle 1000 to heave in the Z direction may be used, for example, to increase or decrease the altitude of the aerial vehicle that is maintained by the lifting propulsion mechanism discussed above with respect to FIG. 8. For example, if the lifting propulsion mechanism is generating a force that is approximately equal to and opposite the force of gravity acting on the aerial vehicle 1000 and the vertically aligned maneuverability propulsion mechanisms 1002-3 and 1002-6 generate a positive vertical force, as illustrated in FIG. 10, the altitude of the aerial vehicle will increase because the total force acting on the vehicle as a result of the lifting propulsion mechanism and the forces 1003-3, and 1003-6 is greater than the force of gravity acting on the aerial vehicle. Similarly, if the lifting propulsion mechanism is generating a force that is approximately equal to and opposite the force of gravity acting on the aerial vehicle 1000 and the vertically aligned maneuverability propulsion mechanisms 1002-3 and 1002-6 generate a negative vertical force, the altitude of the aerial vehicle will decrease because the total force acting on the aerial vehicle as a result of the negative vertical force from the maneuverability propulsion mechanisms and the force of gravity is greater than the force generated by the lifting propulsion mechanism.

If no other movement of the aerial vehicle is commanded, the other maneuverability propulsion mechanisms 1002-1, 1002-2, 1002-4, and 1002-5 may not generate any force. If other movements are commanded in addition to a heave in the Z direction, one or more of the other maneuverability propulsion mechanisms 1002 may likewise generate a force and/or one of the forces 1003-3 or 1003-6 may be greater or less, thereby causing the aerial vehicle to roll about the X axis.

Figure 11:
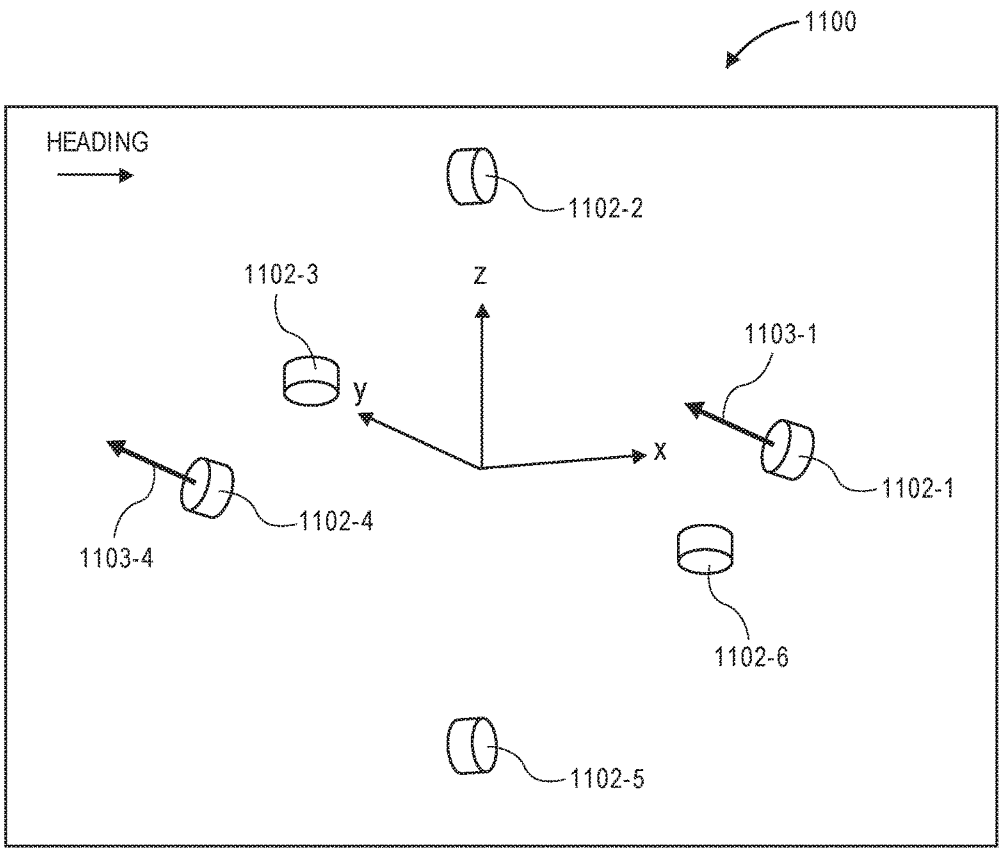
FIG. 11 is a diagram of the maneuverability propulsion mechanisms of the aerial vehicle illustrated in FIG. 8 with thrust vectors to cause the aerial vehicle to sway in the Y direction, according to an implementation.

FIG. 11 is a diagram of the maneuverability propulsion mechanisms of the aerial vehicle illustrated in FIG. 8 with thrust vectors to cause the aerial vehicle to sway in the Y direction, according to an implementation. The maneuverability propulsion mechanisms 1103 illustrated in FIG. 11 correspond to the maneuverability propulsion mechanisms illustrated in FIG. 8. Because both of the maneuverability propulsion mechanisms are aligned in the Y direction, the generated forces 1103-1 and 1103-4 only have a Y component. Those forces 1103-1 and 1103-4 cause the aerial vehicle 1100 to sway in the Y direction.

In the configuration of the aerial vehicle 1100, to cause the aerial vehicle 1200 to sway in the Y direction, horizontally aligned maneuverability propulsion mechanisms 1102-1 and 1102-4 generate forces 1103-1 and 1103-4 in the Y direction that are approximately equal in magnitude and direction. Those forces 1103-1 and 1103-4 cause the aerial vehicle 1100 to sway in the Y direction.

If no other movement of the aerial vehicle is commanded, the other maneuverability propulsion mechanisms 1102-2, 1102-3, 1102-5, and 1102-6 may not generate any force. If other movements are commanded in addition to a sway in the Y direction, one or more of the other maneuverability propulsion mechanisms 1102 may likewise generate a force and/or one of the forces 1103-1 or 1103-4 may be greater or less, thereby causing the aerial vehicle to yaw about the Z axis.

FIG. 12 is a diagram of the maneuverability propulsion mechanisms 1202 of the aerial vehicle illustrated in FIG. 8 with thrust vectors 1203 to cause the aerial vehicle to yaw about the Z axis, according to an implementation. The maneuverability propulsion mechanisms 1202 illustrated in FIG. 12 correspond to the maneuverability propulsion mechanisms illustrated in FIG. 8. Because both of the maneuverability propulsion mechanisms are aligned, the generated forces 1203-1 and 1203-4 only have a Y component. Those forces 1203-1 and 1203-4 cause the aerial vehicle 1200 to yaw about the Z axis.

In the configuration of the aerial vehicle 1200, to cause the aerial vehicle 1200 to yaw about the Z axis, horizontally aligned maneuverability propulsion mechanisms 1202-1 and 1202-4 generate forces in the Y direction that are approximately equal in magnitude but opposite in direction. The opposing direction of the forces 1203-1 and 1203-4 cause the aerial vehicle 1200 to yaw about the Z axis.

If no other movement of the aerial vehicle is commanded, the other maneuverability propulsion mechanisms 1202-2, 1202-3, 1202-5, and 1202-6 may not generate any force. If other movements are commanded in addition to a yaw, one or more of the other maneuverability propulsion mechanisms 1202 may likewise generate a force.

FIG. 13 is a diagram of the maneuverability propulsion mechanisms of the aerial vehicle illustrated in FIG. 8 with thrust vectors to cause the aerial vehicle to pitch about the Y axis, according to an implementation. The maneuverability propulsion mechanisms 1303 illustrated in FIG. 13 correspond to the maneuverability propulsion mechanisms illustrated in FIG. 8. Because both of the maneuverability propulsion mechanisms 1302-2 and 1302-5 are aligned in the X direction, the generated forces 1303-2 and 1303-5 only have an X component. Those forces 1303-2 and 1303-5 cause the aerial vehicle 1300 to pitch about the Y axis.

In the configuration of the aerial vehicle 1300, to cause the aerial vehicle 1300 to pitch about the Y axis, horizontally aligned maneuverability propulsion mechanisms 1302-2 and 1302-5 generate forces that are approximately equal in magnitude but opposite in direction. The opposing direction of the forces 1303-2 and 1303-5 cause the aerial vehicle 1300 to pitch downward about the Y axis.

If no other movement of the aerial vehicle is commanded, the other maneuverability propulsion mechanisms 1302-1, 1302-3, 1302-4, and 1302-6 may not generate any force. If other movements are commanded in addition to a yaw, one or more of the other maneuverability propulsion mechanisms 1302 may likewise generate a force.

FIG. 14 is a diagram of the maneuverability propulsion mechanisms of the aerial vehicle illustrated in FIG. 8 with thrust vectors to cause the aerial vehicle to roll about the X axis, according to an implementation. The maneuverability propulsion mechanisms 1403 illustrated in FIG. 14 correspond to the maneuverability propulsion mechanisms illustrated in FIG. 8. Because both of the maneuverability propulsion mechanisms 1402-3 and 1402-6 are aligned in the Z direction, the generated forces 1403-3 and 1403-6 only have a Z component. Those forces 1403-3 and 1403-6 cause the aerial vehicle 1400 to roll about the X axis.

In the configuration of the aerial vehicle 1400, to cause the aerial vehicle 1400 to roll about the X axis, vertically aligned maneuverability propulsion mechanisms 1402-3 and 1402-6 generate forces 1403-3 and 1403-6 that are approximately equal in magnitude but opposite in direction. Because the two forces are equal in magnitude and opposite in the Z direction, the combined forces will cause the aerial vehicle to roll about the X axis.

If no other movement of the aerial vehicle is commanded, the other maneuverability propulsion mechanisms 1402-1, 1402-2, 1402-4, and 1402-5 may not generate any force. If other movements are commanded in addition to a roll about the X axis, one or more of the other maneuverability propulsion mechanisms 1402 may likewise generate a force to cause other maneuvers by the aerial vehicle in addition to a roll.

Figure 15:
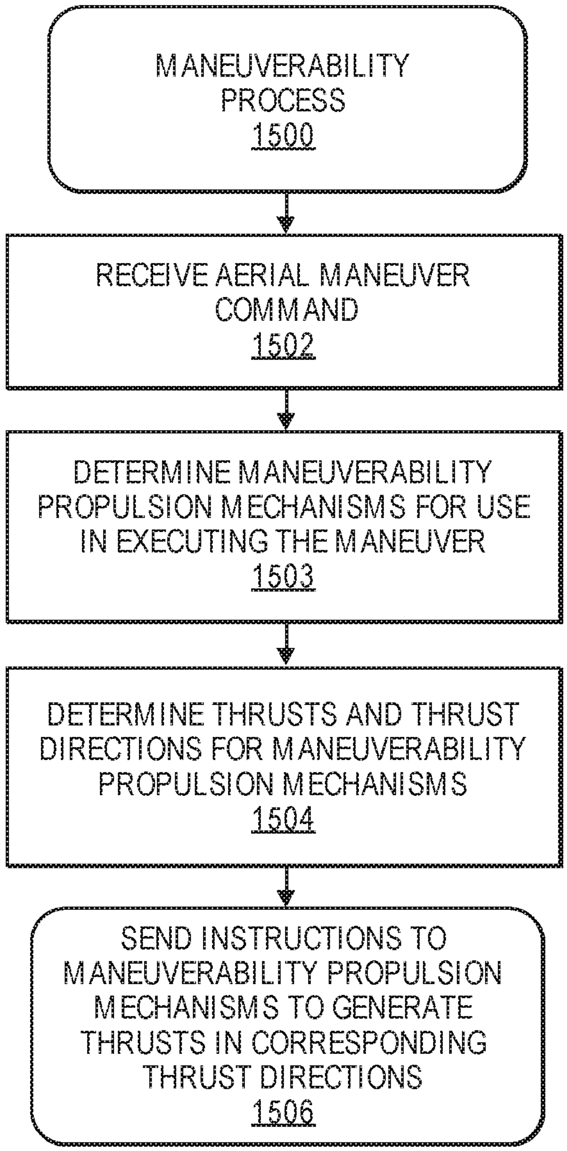
FIG. 15 is a flow diagram illustrating an example maneuverability process, according to an implementation.

FIG. 15 is a flow diagram illustrating an example maneuverability process 1500, according to an implementation. The example process of FIG. 15 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine.

The example maneuverability process 1500 begins by receiving an aerial navigation command that includes a maneuver, as in 1502. A maneuver may be any command to alter or change an aspect of the aerial vehicle's current flight. For example, a maneuver may be to ascend or descend (heave), increase or decrease speed (surge), move right or left (sway), pitch, yaw, roll, and/or any combination thereof.

Based on the commanded maneuver, the example process determines the maneuverability propulsion mechanisms to be used in executing the maneuver, as in 1503. As discussed herein, the aerial vehicle may include a lifting propulsion mechanism that may be used to generate a lifting force that will maintain the aerial vehicle at an altitude. Likewise, the aerial vehicle may include multiple maneuverability propulsion mechanisms, as discussed herein with respect to FIGS. 1-14, and FIGS. 17-23 that may be selectively used to generate thrusts that will cause the aerial vehicle to execute one or more maneuvers, in any of the six degrees of freedom.

In addition to determining the maneuverability propulsion mechanisms that are to be used to execute the maneuvers, the magnitude and direction of the thrust to be generated by each of the maneuverability propulsion mechanisms is determined, as in 1504. As discussed above, in some implementations, the maneuverability propulsion mechanisms may be configured to generate forces in either direction in which they are aligned. Alternatively, or in addition thereto, the maneuverability propulsion mechanisms may be configured such that they are rotatable between two or more positions so that forces generated by the maneuverability propulsion mechanism may be oriented in different directions.

Based on the determined maneuverability propulsion mechanisms that are to be used to generate the commanded maneuvers and the determined magnitudes and directions of the forces to be generated by those maneuverability propulsion mechanisms, instructions are sent to the determined maneuverability propulsion mechanisms that cause the forces to be generated, as in 1506.

Figure 16:
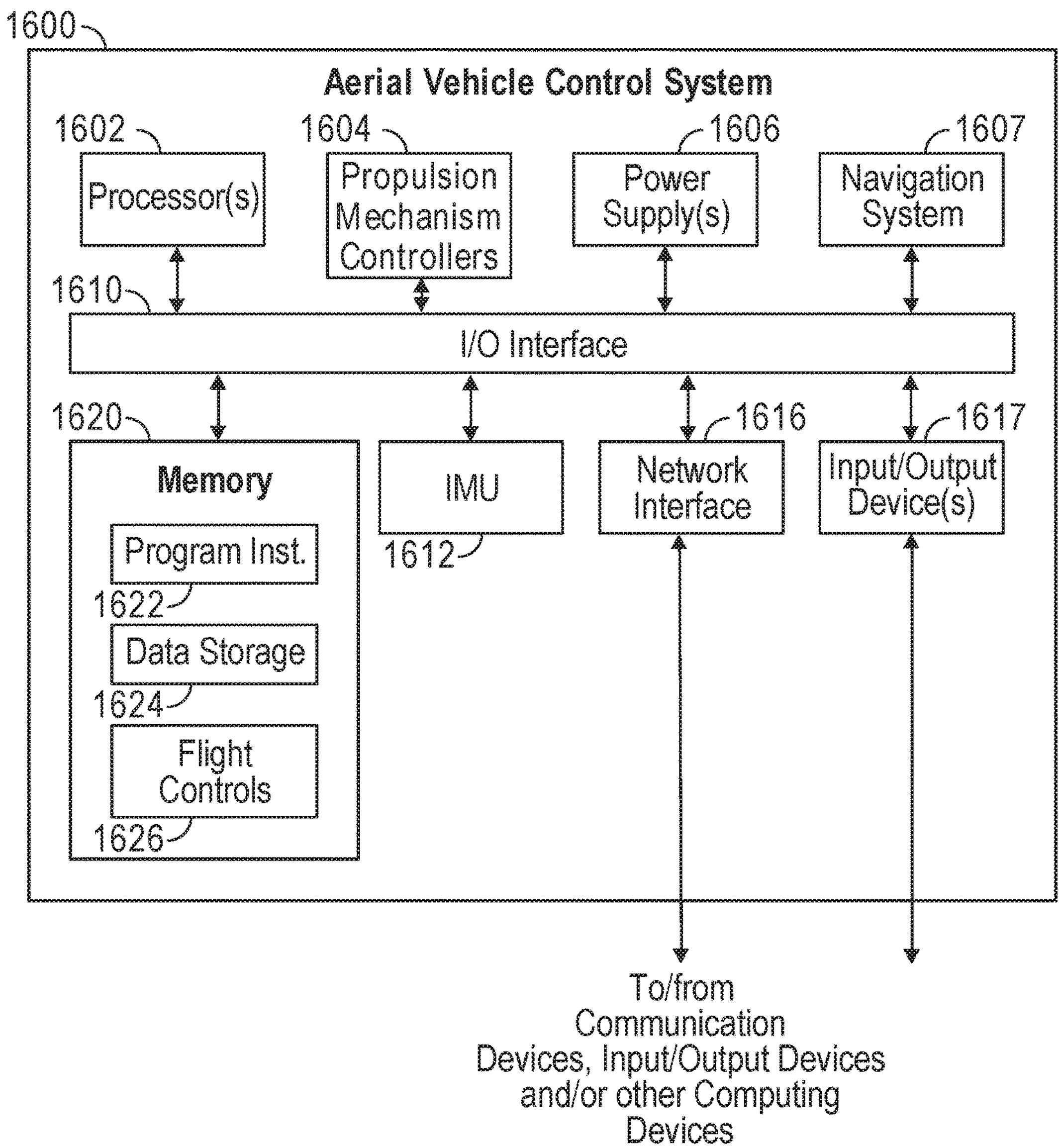
FIG. 16 is a block diagram illustrating various components of an unmanned aerial vehicle control system, according to an implementation.

FIG. 16 is a block diagram illustrating an example aerial vehicle control system 1600, according to an implementation. In various examples, the block diagram may be illustrative of one or more aspects of the aerial vehicle control system 1600 that may be used to implement the various systems and methods discussed herein and/or to control operation of an aerial vehicle discussed herein. In the illustrated implementation, the aerial vehicle control system 1600 includes one or more processors 1602, coupled to a memory, e.g., a non-transitory computer readable storage medium 1620, via an input/output (I/O) interface 1610. The aerial vehicle control system 1600 also includes propulsion mechanism controllers 1604, such as electronic speed controls (ESCs), power supply modules 1606 and/or a navigation system 1607. The aerial vehicle control system 1600 further includes a payload engagement controller 1612, a network interface 1616, and one or more input/output devices 1617.

In various implementations, the aerial vehicle control system 1600 may be a uniprocessor system including one processor 1602, or a multiprocessor system including several processors 1602 (e.g., two, four, eight, or another suitable number). The processor(s) 1602 may be any suitable processor capable of executing instructions. For example, in various implementations, the processor(s) 1602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1602 may commonly, but not necessarily, implement the same ISA.

The non-transitory computer readable storage medium 1620 may be configured to store executable instructions, data, flight paths, flight control parameters, center of gravity information, and/or data items accessible by the processor(s) 1602. In various implementations, the non-transitory computer readable storage medium 1620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1620 as program instructions 1622, data storage 1624 and flight controls 1626, respectively. In other implementations, program instructions, data, and/or flight controls may be received, sent, or stored upon different types of computer-accessible media, such as non-transitory media, or on similar media separate from the non-transitory computer readable storage medium 1620 or the aerial vehicle control system 1600. Generally speaking, a non-transitory, computer readable storage medium may include storage media or memory media such as magnetic or optical media, e.g., disk or CD/DVD-ROM, coupled to the aerial vehicle control system 1600 via the I/O interface 1610. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1616.

In one implementation, the I/O interface 1610 may be configured to coordinate I/O traffic between the processor(s) 1602, the non-transitory computer readable storage medium 1620, and any peripheral devices, the network interface or other peripheral interfaces, such as input/output devices 1617. In some implementations, the I/O interface 1610 may perform any necessary protocol, timing or other data transformations to convert data signals from one component (e.g., non-transitory computer readable storage medium 1620) into a format suitable for use by another component (e.g., processor(s) 1602). In some implementations, the I/O interface 1610 may include support for devices attached through various types of peripheral buses, such as a variant of the Peripheral Component Interconnect (PCI) bus standard or the Universal Serial Bus (USB) standard, for example. In some implementations, the function of the I/O interface 1610 may be split into two or more separate components, such as a north bridge and a south bridge, for example. Also, in some implementations, some or all of the functionality of the I/O interface 1610, such as an interface to the non-transitory computer readable storage medium 1620, may be incorporated directly into the processor(s) 1602.

The propulsion mechanism controllers 1604 communicate with the navigation system 1607 and adjust the rotational speed of each lifting propulsion mechanism and/or the maneuverability propulsion mechanisms to stabilize the aerial vehicle and/or to perform one or more maneuvers and guide the aerial vehicle along a flight path.

The navigation system 1607 may include a global positioning system (GPS), indoor positioning system (IPS), or other similar system and/or sensors that can be used to navigate the aerial vehicle 100 to and/or from a location. The payload engagement controller 1612 communicates with the actuator(s) or motor(s) (e.g., a servo motor) used to engage and/or disengage items.

The network interface 1616 may be configured to allow data to be exchanged between the aerial vehicle control system 1600, other devices attached to a network, such as other computer systems (e.g., remote computing resources), and/or with aerial vehicle control systems of other aerial vehicles. For example, the network interface 1616 may enable wireless communication between the aerial vehicle and an aerial vehicle control system that is implemented on one or more remote computing resources. For wireless communication, an antenna of the aerial vehicle or other communication components may be utilized. As another example, the network interface 1616 may enable wireless communication between numerous aerial vehicles. In various implementations, the network interface 1616 may support communication via wireless general data networks, such as a Wi-Fi network. For example, the network interface 1616 may support communication via telecommunications networks, such as cellular communication networks, satellite networks, and the like.

Input/output devices 1617 may, in some implementations, include one or more displays, imaging devices, thermal sensors, infrared sensors, time of flight sensors, accelerometers, pressure sensors, weather sensors, etc. Multiple input/output devices 1617 may be present and controlled by the aerial vehicle control system 1600. One or more of these sensors may be utilized to assist in landing as well as to avoid obstacles during flight.

As shown in FIG. 16, the memory may include program instructions 1622, which may be configured to implement the example routines and/or sub-routines described herein. The data storage 1624 may include various data stores for maintaining data items that may be provided for determining flight paths, landing, identifying locations for disengaging items, determining which maneuver propulsion mechanisms to utilize to execute a maneuver, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1600 is merely illustrative and is not intended to limit the scope of the present disclosure. In particular, the computing system and devices may include any combination of hardware or software that can perform the indicated functions. The aerial vehicle control system 1600 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 1600. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible medium separate from the aerial vehicle control system 1600 may be transmitted to the aerial vehicle control system 1600 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

Figure 17:
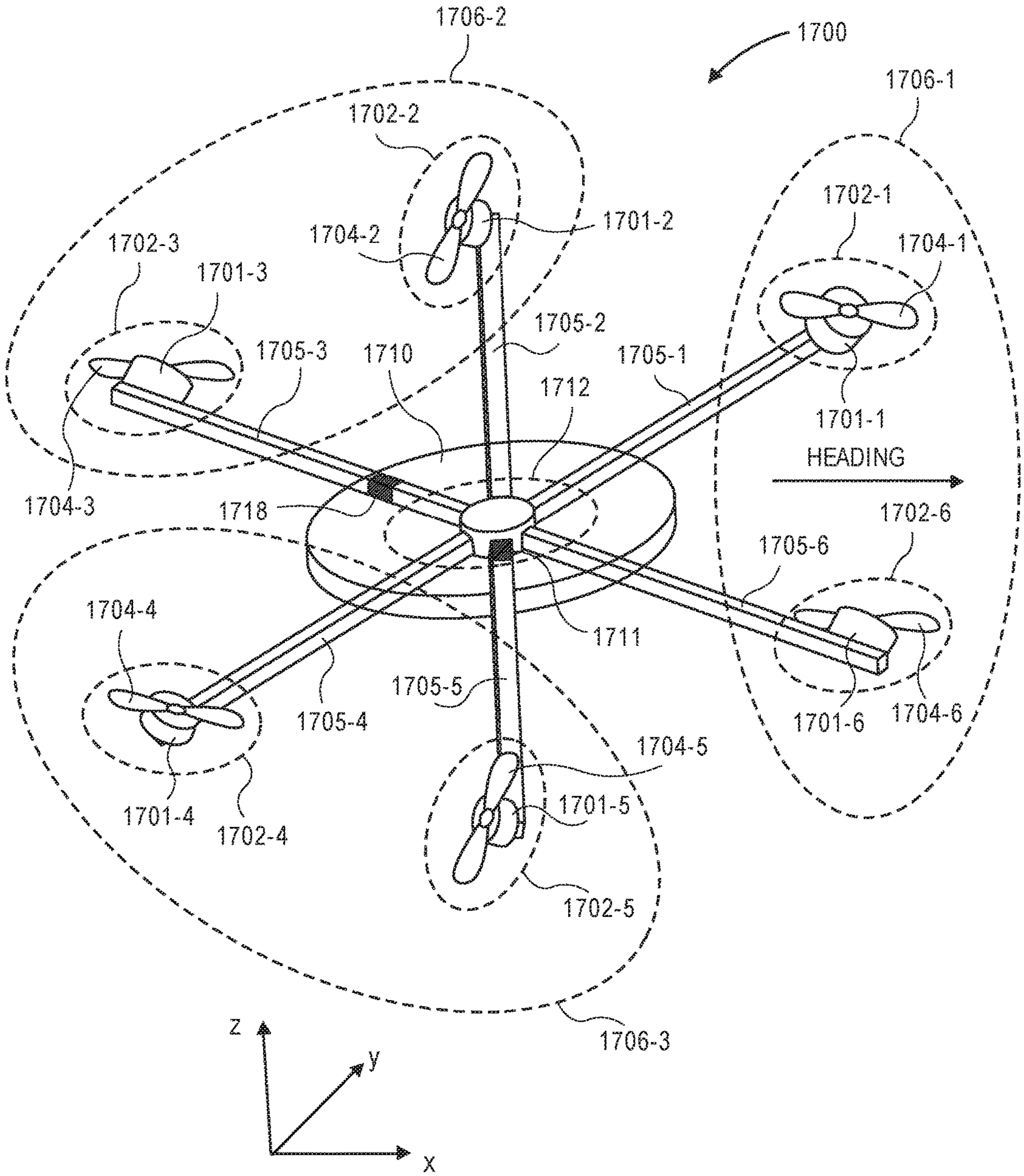
FIG. 17 depicts a diagram of an aerial vehicle, according to an implementation.

FIG. 17 illustrates a view of another aerial vehicle 1700, according to an implementation. The aerial vehicle 1700 includes six maneuverability motors 1701-1, 1701-2, 1701-3, 1701-4, 1701-5, and 1701-6 and corresponding maneuverability propellers 1704-1, 1704-2, 1704-3, 1704-4, 1704-5, and 1704-6 spaced about the body of the aerial vehicle 1700. The propellers 1704 may be any form of propeller (e.g., graphite, carbon fiber) and of any size. For example, the maneuverability propellers may be 10 inch-12 inch diameter carbon fiber propellers.

The form and/or size of some of the maneuverability propellers may be different than other maneuverability propellers. Likewise, the maneuverability motors 1701 may be any form of motor, such as a DC brushless motor, and may be of a size sufficient to rotate the corresponding maneuverability propeller. Likewise, in some implementations, the size and/or type of some of the maneuverability motors 1701 may be different than other maneuverability motors 1701. In some implementations, the maneuverability motors may be rotated in either direction such that the force generated by the maneuverability propellers may be either a positive force, when rotating in a first direction, or a negative force, when rotating in the second direction. Alternatively, or in addition thereto, the pitch of the blades of a maneuverability propeller may be variable. By varying the pitch of the blades, the force generated by the maneuverability propeller may be altered to either be in a positive direction or a negative direction.

Each pair of maneuverability motors 1701 and corresponding maneuverability propeller 1704 will be referred to herein collectively as a maneuverability propulsion mechanism 1702, such as maneuverability propulsion mechanisms 1702-1, 1702-2, 1702-3, 1702-4, 1702-5, and 1702-6. Likewise, while the example illustrated in FIG. 17 describes the maneuverability propulsion mechanisms 1702 as including maneuverability motors 1701 and maneuverability propellers 1704, in other implementations, other forms of propulsion may be utilized as the maneuverability propulsion mechanisms 1702. For example, one or more of the maneuverability propulsion mechanisms 1702 of the aerial vehicle

1700 may utilize fans, jets, turbojets, turbo fans, jet engines, and/or the like to maneuver the aerial vehicle. Generally described, a maneuverability propulsion mechanism 1702, as used herein, includes any form of propulsion mechanism that is capable of generating a force sufficient to maneuver the aerial vehicle, alone and/or in combination with other propulsion mechanisms. Furthermore, in selected implementations, propulsion mechanisms (e.g., 1702-1, 1702-2, 1702-3, 1702-4, 1702-5, and 1702-6) may be configured such that their individual orientations may be dynamically modified (e.g., change from vertical to horizontal orientation) or any position therebetween. For example, if the aerial vehicle is navigating in a horizontal direction, one or more of the propulsion mechanisms 1702 may alter orientation to provide horizontal thrust to propel the aerial vehicle horizontally. Likewise, one or more of the propulsion mechanisms may be oriented in other directions to provide thrust for other navigation maneuvers.

Likewise, while the examples herein describe the propulsion mechanisms being able to generate force in either direction, in some implementations, the maneuverability mechanisms may only generate force in a single direction. However, the orientation of the maneuverability mechanism may be adjusted so that the force can be oriented in a positive direction, a negative direction, and/or any other direction.

As illustrated, the maneuverability propulsion mechanisms 1702 may be oriented at different angles. As illustrated in FIG. 17, the maneuverability propulsion mechanisms are all oriented at an angle with respect to a vertical alignment. For example, and for purposes of discussions, assigning zero degrees to propulsion mechanisms that are vertically aligned (i.e., are oriented to produce a substantially vertical lifting force), as discussed above, the maneuverability propulsion mechanisms illustrated in FIG. 17 are oriented approximately thirty-degrees from vertical when rotated about the respective motor art 1705, in either direction. In addition, the direction of orientation of the maneuverability propulsion mechanisms is such that pairs of maneuverability propulsion mechanisms are oriented toward one another. For example, maneuverability propulsion mechanism 1702-1 is oriented approximately thirty degrees in a first direction about the first motor arm 1705-1 and maneuverability propulsion mechanism 1702-6 is oriented approximately thirty degrees in a second direction about the sixth motor arm 1705-6, the second direction opposing the first direction so that the two maneuverability propulsion mechanisms 1702-1, 1702-6 are partially oriented toward one another to form a first pair of maneuverability propulsion mechanisms 1706-1, as illustrated in FIG. 17. Likewise, maneuverability propulsion mechanism 1702-3 is oriented approximately thirty degrees in the first direction about the third motor arm 1705-3 and maneuverability propulsion mechanism 1702-2 is oriented approximately thirty degrees in the second direction about the second motor arm 1705-2 so that the two propulsion mechanisms 1702-3, 1702-2 are partially oriented toward one another to form a second pair of propulsion mechanisms 1706-2. Finally, maneuverability propulsion mechanism 1702-5 is oriented approximately thirty degrees in the first direction about the fifth motor arm 1705-5 and maneuverability propulsion mechanism 1702-4 is oriented approximately thirty degrees in the second direction about the fourth motor arm 1705-4 so that the two propulsion mechanisms 1702-4, 1702-5 are partially oriented toward one another to form a third pair of propulsion mechanisms 1706-3.

While the example discussed above and illustrated in FIG. 17 discusses rotating the maneuverability propulsion mechanisms approximately thirty degrees about each respective motor arm 1705, in other implementations, the orientation of the maneuverability propulsion mechanisms may be greater or less than thirty degrees. In some implementations, if maneuverability of the aerial vehicle 1700 is of higher importance, the orientation of the maneuverability propulsion mechanisms may be higher than thirty degrees. For example, each of the maneuverability propulsion mechanisms may be oriented approximately forty-five degrees from a vertical orientation about each respective motor arm 1705, in either the first or second direction. In comparison, if lifting force is of higher importance, the orientation of the propulsion mechanisms 1702 may be less than thirty degrees. For example, each maneuverability propulsion mechanism may be oriented approximately ten degrees from a vertical orientation about each respective motor arm 1705.

In some implementations, the orientations of some propulsion mechanisms may be different than other propulsion mechanisms 1702. For example, propulsion mechanisms 1702-1, 1702-3, and 1702-5 may each be oriented approximately fifteen degrees in the first direction and propulsion mechanisms 1702-2, 1702-4, and 1702-6 may be oriented approximately twenty-five degrees in the second direction. In still other examples, pairs of maneuverability propulsion mechanisms may have different orientations than other pairs of maneuverability propulsion mechanisms. For example, maneuverability propulsion mechanisms 1702-1 and 1702-6 may each be oriented approximately thirty degrees in the first direction and second direction, respectively, toward one another, maneuverability propulsion mechanisms 1702-3 and 1702-2 may each be oriented approximately forty-five degrees in the first direction and second direction, respectively, toward one another, and maneuverability propulsion mechanisms 1702-5 and 1702-4 may each be oriented approximately forty-five degrees in the first direction and second direction, respectively, toward one another.

As discussed below, by orienting maneuverability propulsion mechanisms partially toward one another in pairs, as illustrated, the lateral or horizontal forces generated by the pairs of maneuverability propulsion mechanisms, when producing the same amount of force, will cancel out such that the sum of the forces from the pair is only in a substantially vertical direction (Z direction). Likewise, as discussed below, if one propulsion mechanism of the pair produces a force larger than a second propulsion mechanism, a lateral or horizontal force will result in the X direction or and/or the Y direction. A horizontal force produced from one or more of the pairs of propulsion mechanisms enables the aerial vehicle to translate in a horizontal direction and/or yaw without altering the pitch of the aerial vehicle. Producing lateral forces by multiple pairs of maneuverability propulsion mechanisms 1706 will cause the aerial vehicle 1700 to operate independent in any of the six degrees of freedom (surge, sway, heave, pitch, yaw, and roll). As a result, the stability and maneuverability of the aerial vehicle 1700 is increased.

In this example, each of the maneuverability propulsion mechanisms 1702 are positioned in approximately the same plane, in this example the X-Y plane, and spaced approximately sixty degrees from each other, such that the maneuverability propulsion mechanisms 1702 are positioned at approximately equal distances with respect to one another and around the perimeter of the aerial vehicle 1700. For example, the first maneuverability propulsion mechanism 1702-1 may be positioned in the X-Y plane at approximately thirty degrees from the X axis, the second maneuverability propulsion mechanism 1702-2 may be positioned in the X-Y plane at approximately ninety degrees from the X axis, the third propulsion mechanism 1702-3 may be positioned in the X-Y plane at approximately one-hundred fifty degrees from the X axis, the fourth maneuverability propulsion mechanism 1702-4 may be positioned in the X-Y plane at approximately two-hundred ten degrees from the X axis, the fifth maneuverability propulsion mechanism 1702-5 may be positioned in the X-Y plane at approximately two-hundred seventy degrees from the X axis, and the sixth maneuverability propulsion mechanism 1702-6 may be positioned in the X-Y plane at approximately three-hundred and thirty degrees from the X axis.

In other implementations, the spacing between the maneuverability propulsion mechanisms may be different. For example, maneuverability propulsion mechanisms 1702-1, 1702-3, and 1702-5, which are oriented in the first direction, may each be approximately equally spaced 120 degrees apart and maneuverability propulsion mechanisms 1702-2, 1702-4, and 1702-6, which are oriented in the second direction, may also be approximately equally spaced 120 degrees apart. However, the spacing between maneuverability propulsion mechanisms oriented in the first direction and maneuverability propulsion mechanisms oriented in the second direction may not be equal. For example, the maneuverability propulsion mechanisms 1702-1, 1702-3, and 1702-5 oriented in the first direction, may be positioned at approximately zero degrees, approximately 120 degrees, and approximately 240 degrees around the perimeter of the aerial vehicle with respect to the X axis and in the X-Y plane, and the maneuverability propulsion mechanisms 1702-2, 1702-4, and 1702-6, oriented in the second direction, may be positioned at approximately 10 degrees, approximately 130 degrees, and approximately 250 degrees around the perimeter of the aerial vehicle 1700 with respect to the X axis and in the X-Y plane.

In other implementations, the maneuverability propulsion mechanisms may have other alignments. Likewise, in other implementations, there may be fewer or additional maneuverability propulsion mechanisms. Likewise, in some implementations, the maneuverability propulsion mechanisms may not all be aligned in the X-Y plane.

To counteract the angle of momentum of the propellers 1704, in some implementations, every other maneuverability propeller 1704 may rotate in an opposite direction. For example, in one implementation, maneuverability propellers 1704-1, 1704-3, and 1704-5 may rotate in a clockwise direction and maneuverability propellers 1704-2, 1704-4, and 1704-6 may rotate in a counter-clockwise direction. In other implementations, maneuverability propellers 1704-1, 1704-3, and 1704-5 may rotate in a counter-clockwise direction and maneuverability propellers 1704-2, 1704-4, and 1704-6 may rotate in a clockwise direction.

In some implementations, as discussed above with respect to FIG. 1, the aerial vehicle 1700 may also include one or more lifting propulsion mechanisms. The lifting mechanism are of a size and configuration to generate a force that will lift the aerial vehicle and any engaged payload such that the aerial vehicle can aerially navigate. In other implementations, the maneuverability propulsion mechanisms 1702 may be configured to provide lift and maneuverability for the aerial vehicle, without the need for a separate lifting propulsion mechanism. In such a configuration, the maneuverability propulsion mechanisms 1702 may be configured so that the six maneuverability propulsion mechanisms 1702-1, 1702-2, 1702-3, 1702-4, 1702-5, and 1702-6 can produce force sufficient to aerially navigate the aerial vehicle and any attached payload and maneuver in any of the discussed six degrees of freedom. Likewise, the maneuverability propulsion mechanisms may be further configured for redundancy such that if any one of the maneuverability propulsion mechanisms fail during operation, the aerial vehicle can still safely operate with the remaining maneuverability propulsion mechanisms 1702 in any of four degrees of freedom (heave, pitch, yaw, and roll).

The body or housing of the aerial vehicle 1700 may likewise be of any suitable material, such as graphite, carbon fiber, and/or aluminum. In this example, the body of the aerial vehicle 1700 includes a perimeter shroud 1710 and six arms 1705-1, 1705-2, 1705-3, 1705-4, 1705-5, and 1705-6 that extend radially from a central portion of the aerial vehicle. In this example, each of the arms are coupled to and form the central portion. Coupled to the opposing ends of the arms 1705-1, 1705-2, 1705-3, 1705-4, 1705-5, and 1705-6 are the maneuverability propulsion mechanisms 1702, discussed above. Also, as discussed above, the spacing between the different maneuverability propulsion mechanisms may be altered by altering a position of one or more of the arms 1705 extending from the central portion of the aerial vehicle 1700.

While the implementation illustrated in FIG. 17 includes six arms 1705 that extend radially from a central portion of the aerial vehicle 1700 to form the frame or body of the aerial vehicle, in other implementations, there may be fewer or additional arms. For example, the aerial vehicle may include support arms that extend between the arms 1705 and provide additional support to the aerial vehicle and/or to support the payload engagement mechanism 1712. The arms 1705, shroud 1710, and/or payload engagement mechanism 1712 of the aerial vehicle may be formed of any type of material, including, but not limited to, graphite, carbon fiber, aluminum, titanium, Kevlar, etc.

As discussed, in the illustrated configuration of the aerial vehicle 1700, three of the maneuverability propulsion mechanisms 1702-1, 1702-3, and 1702-5 are oriented in a first direction about the respective motor arm and with respect to a vertical orientation and three of the maneuverability propulsion mechanisms 1702-2, 1702-4, and 1702-6 are oriented in a second direction about the respective motor arm that is opposite the first direction. With such a configuration, the aerial vehicle 1700 can be aerially navigated in any direction and with any orientation. Likewise, the aerial vehicle 1700 can navigate in any of the six degrees of freedom without having to operate in any of the other degrees of freedom. For example, the aerial vehicle 1700 can sway in the Y direction without also having to roll about the X axis.

In some implementations, the payload engagement mechanism 1712 may be coupled to one or more of the arms 1705 and be configured to selectively engage and/or disengage a payload. Also coupled to and/or included within one or more of the arms 1705 is an aerial vehicle control system 1711 and one or more power modules 1718, such as a battery. In this example, the aerial vehicle control system 1711 is mounted inside arm 1705-5 and the power module 1718 is mounted to the arm 1705-3. The aerial vehicle control system 1711, as discussed in further detail above with respect to FIG. 16, controls the operation, routing, navigation, communication, maneuverability propulsion mechanisms, and/or the payload engagement mechanism 1712 of the aerial vehicle 1700.

The power module(s) 1718 may be removably mounted to the aerial vehicle 1700. The power module(s) 1718 for the aerial vehicle may be in the form of battery power, solar power, gas power, super capacitor, fuel cell, alternative power generation source, or a combination thereof. The power module(s) 1718 are coupled to and provide power for the aerial vehicle control system 1711, the propulsion mechanisms, and the payload engagement mechanism 1712.

In some implementations, one or more of the power modules may be configured such that it can be autonomously removed and/or replaced with another power module. For example, when the aerial vehicle lands at a delivery location, relay location and/or materials handling facility, the aerial vehicle may engage with a charging member at the location that will recharge the power module.

As mentioned above, the aerial vehicle 1700 may also include a payload engagement mechanism 1712. The payload engagement mechanism may be configured to engage and disengage items and/or containers that hold items. In this example, the payload engagement mechanism is positioned beneath the body of the aerial vehicle 1700. The payload engagement mechanism 1712 may be of any size sufficient to securely engage and disengage items and/or containers that contain items. In other implementations, the payload engagement mechanism may operate as the container, containing the item(s). The payload engagement mechanism communicates with (via wired or wireless communication) and is controlled by the aerial vehicle control system 1711.

FIGS. 18-23 are diagrams of the maneuverability propulsion mechanisms of the aerial vehicle illustrated in FIG. 17 viewed from overhead, or from a top-down perspective. To aid in explanation, other components of the aerial vehicle have been omitted from FIGS. 18-23 and different forces in the X or Y direction that may be generated by one or more of the maneuverability propulsion mechanisms are illustrated by vectors. For purposes of discussion, forces generated in the Z direction, or the Z component of forces by the maneuverability propulsion mechanisms have been omitted from FIGS. 18-23. Except where otherwise noted, the sum of the Z components of the forces produced by the maneuverability propulsion mechanisms are equal and opposite the gravitation force acting on the aerial vehicle such that the altitude of the aerial vehicle will remain substantially unchanged.

As will be appreciated, the altitude or vertical position of the aerial vehicle may be increased or decreased by further altering the forces generated by the maneuverability propulsion mechanisms such that the sum of the Z components of the forces are greater (to increase altitude) or less (to decrease altitude) than the gravitational force acting upon the aerial vehicle.

Figure 22:
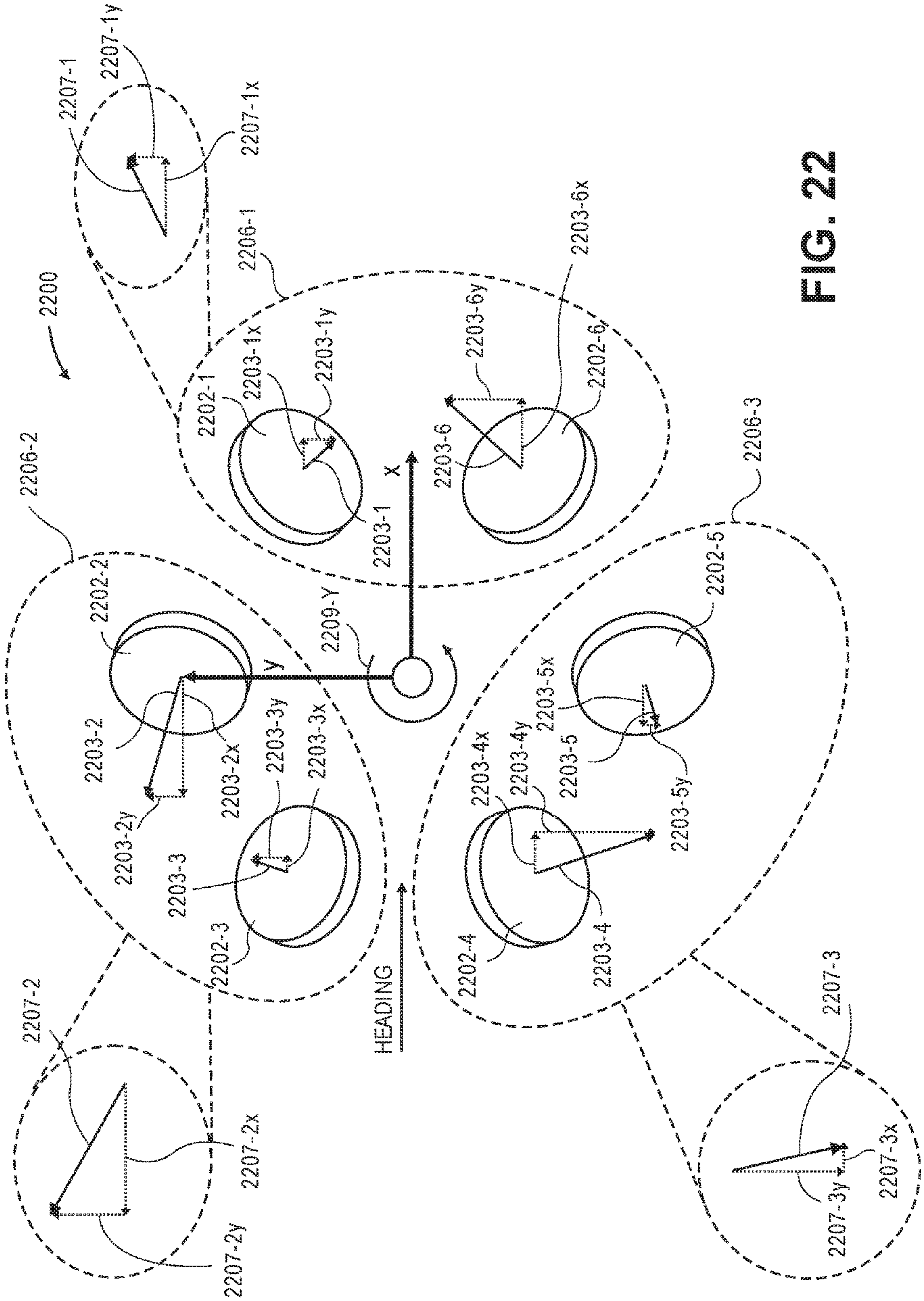
FIG. 22 is a diagram of the maneuverability propulsion mechanisms of the aerial vehicle illustrated in FIG. 17 with thrust vectors to cause the aerial vehicle to yaw, according to an implementation.
Figure 23:
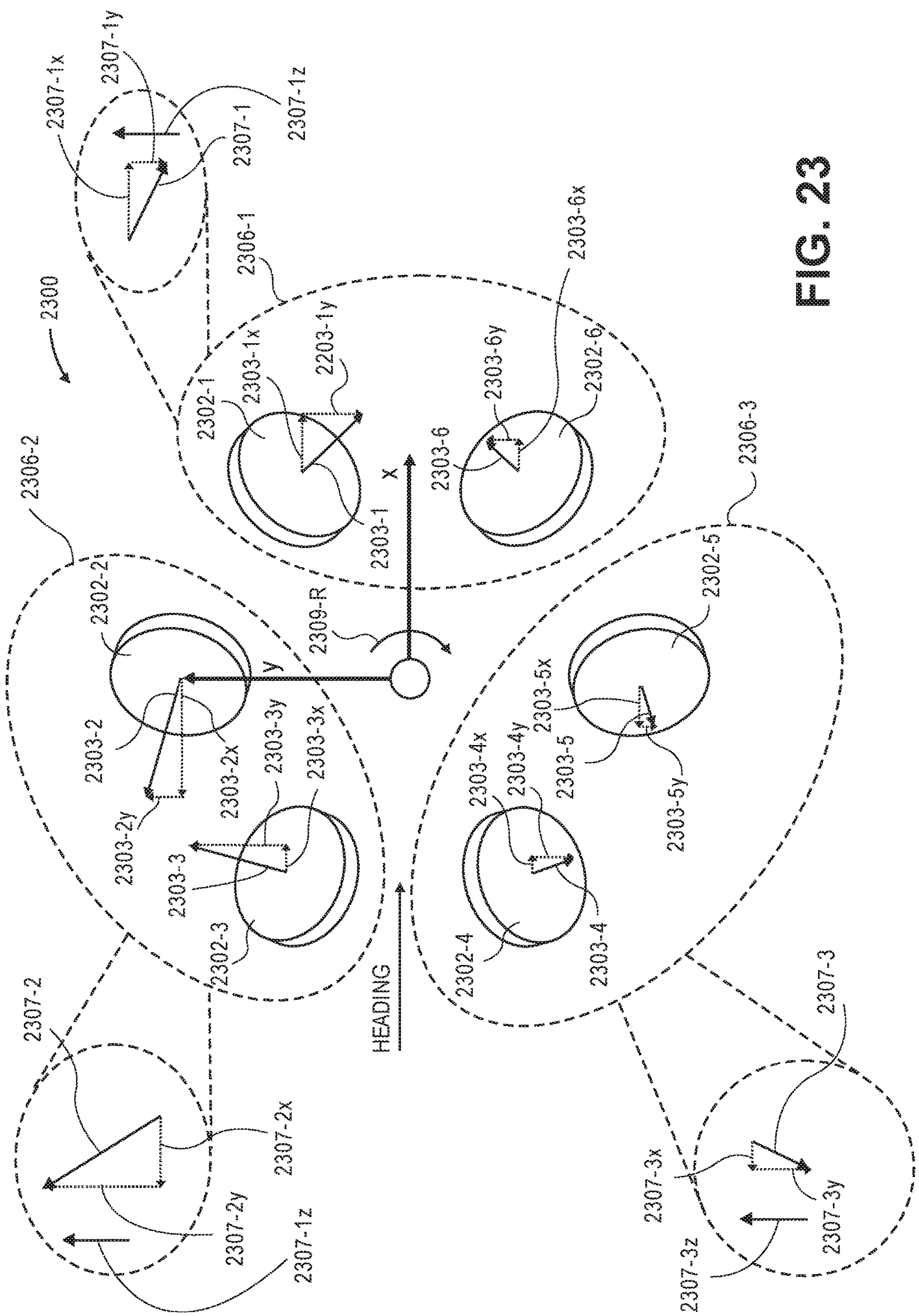
FIG. 23 is a diagram of the maneuverability propulsion mechanisms of the aerial vehicle illustrated in FIG. 17 with thrust vectors to cause the aerial vehicle to roll, according to an implementation.

The illustrated forces, when generated, will cause the aerial vehicle to surge in the X direction (FIG. 18), sway in the Y direction (FIG. 19), hover (FIG. 20), pitch (FIG. 21), yaw (FIG. 22), and roll (FIG. 23).

While the below examples discuss summing of the components of the forces to determine a magnitude and direction of a net force and/or a moment, it will be appreciated that the discussion is for explanation purposes only. The net forces and moments for the illustrated aerial vehicles may be determined by control systems, such as that discussed with respect to FIG. 16 based on the configuration of the aerial vehicle. For example, an influence matrix may be utilized to determine a net force (or net force components) and moments for an aerial vehicle given particular forces or thrusts generated by each propulsion mechanism. Likewise, an inverse influence matrix may be utilized to determine required forces or thrusts for each propulsion mechanism given a desired force, or net force components and moments.

Referring to the aerial vehicle illustrated in FIG. 17 and assuming the propulsion mechanisms are oriented about the respective motor arms approximately thirty degrees in alternating directions, and assuming the propulsion mechanisms are located 1 radius from the origin of the aerial vehicle, the following influence matrix may be used to determine the X, Y, and Z components of a net force and the moments about the X, Y, and Z axis given thrusts for each of the six propulsion mechanisms:

$$\begin{bmatrix} .250 & -.433 & .866 & .425 & -.736 & -.528 \\ -.500 & 0 & .866 & .850 & 0 & .528 \\ .250 & .433 & .866 & .425 & .736 & -.528 \\ .250 & -.433 & .866 & -.425 & .736 & .528 \\ -.500 & 0 & .866 & -.850 & 0 & -.528 \\ .250 & .433 & .866 & -.425 & -.736 & .528 \end{bmatrix} \begin{bmatrix} T1 \\ T2 \\ T3 \\ T4 \\ T5 \\ T6 \end{bmatrix} = \begin{bmatrix} Fx \\ Fy \\ Fz \\ Mx \\ My \\ Mz \end{bmatrix}$$

Likewise, the following inverse influence matrix may be used to determine the thrusts for each of the six propulsion mechanisms given desired net force components and moments:

$$\begin{bmatrix} .333 & -.577 & .192 & .196 & -.340 & -.316 \\ -.667 & 0 & .192 & .392 & 0 & .316 \\ .333 & .577 & .192 & .196 & .340 & -.316 \\ .333 & -.577 & .192 & -.196 & .340 & .316 \\ -.667 & 0 & .192 & -.392 & 0 & -.316 \\ .333 & .577 & .192 & -.196 & -.340 & .316 \end{bmatrix} \begin{bmatrix} Fx \\ Fy \\ Fz \\ Mx \\ My \\ Mz \end{bmatrix} = \begin{bmatrix} T1 \\ T2 \\ T3 \\ T4 \\ T5 \\ T6 \end{bmatrix}$$

Figure 18:
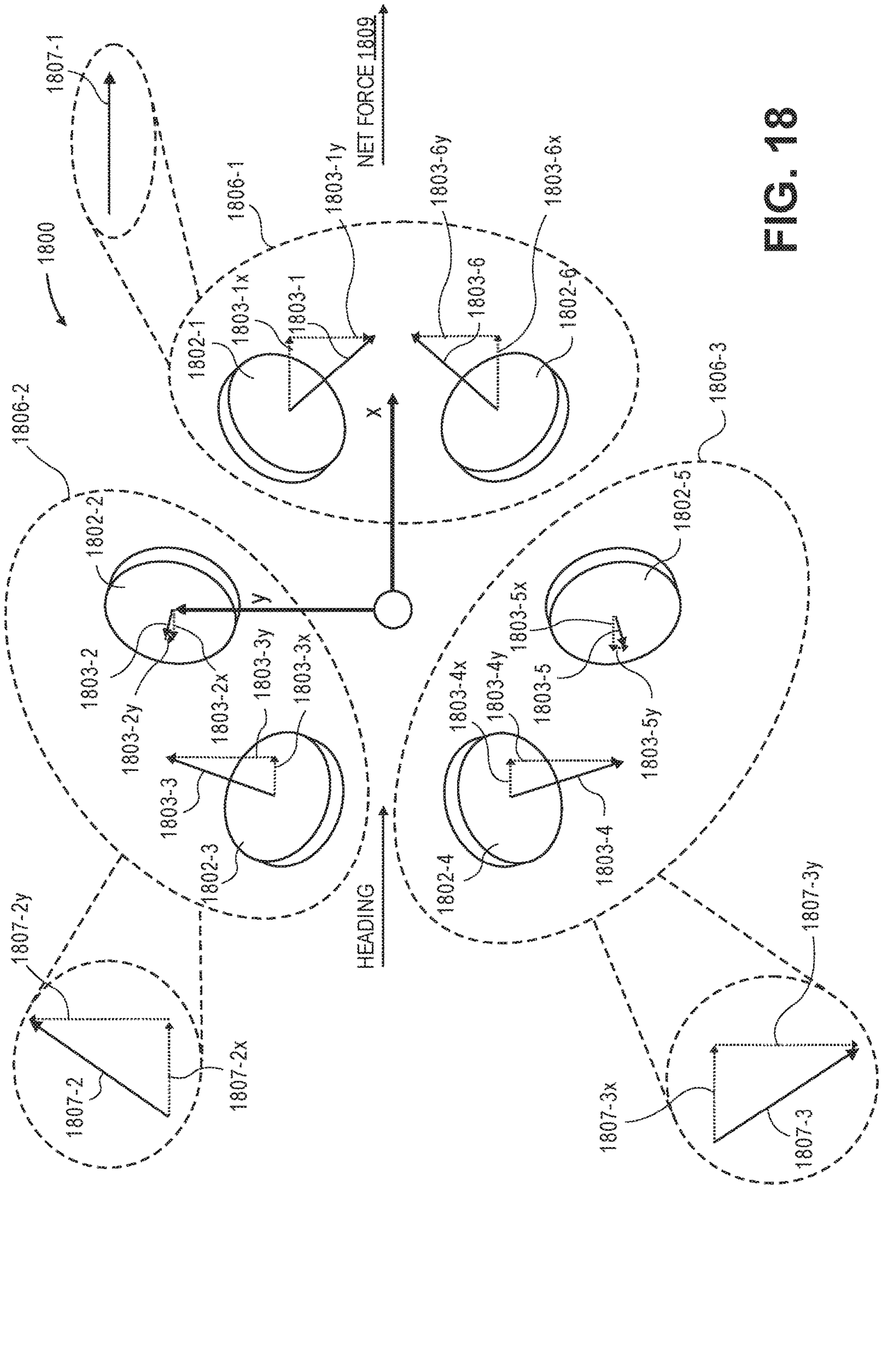
FIG. 18 is a diagram of the maneuverability propulsion mechanisms of the aerial vehicle illustrated in FIG. 17 with thrust vectors to cause the aerial vehicle to surge in the X direction, according to an implementation.

FIG. 18 is a diagram of the maneuverability propulsion mechanisms 1802 of the aerial vehicle illustrated in FIG. 17 with thrust vectors 1803 to cause the aerial vehicle to surge in the X direction, according to an implementation. The maneuverability propulsion mechanisms 1802 illustrated in FIG. 18 correspond to the maneuverability propulsion mechanisms illustrated in FIG. 17. As discussed above, each of the maneuverability propulsion mechanisms 1802 are approximately in the same plane, in this example, the X-Y plane and oriented in pairs 1806 as discussed above. Likewise, while the aerial vehicle may navigate in any direction, FIG. 18 indicates a heading of the aerial vehicle 1800.

In the configuration of the aerial vehicle 1800, to cause the aerial vehicle 1800 to surge in the X direction, maneuverability propulsion mechanisms 1802-1, 1802-3, 1802-4, and 1802-6 generate forces 1803-1, 1803-3, 1803-4, and 1803-6 of approximately equal magnitude, referred to in this example as a first magnitude. Likewise, maneuverability propulsion mechanisms 1802-2 and 1802-5 each produce a force 1803-2 and 1803-5 of equal magnitude, referred to herein as a second magnitude. The second magnitude of forces 1803-2 and 1803-5 is less than the first magnitude of the forces 1803-1, 1803-3, 1803-4, and 1803-6. Each of the forces 1803-1, 1803-2, 1803-3, 1803-4, 1803-5, and 1803-6 have an X component, a Y component, and a Z component. As discussed above, the sum of the Z components of the forces 1803-1, 1803-2, 1803-3, 1803-4, 1803-5, and 1803-6 in the illustrated example is equal and opposite to the gravitational force acting upon the aerial vehicle. Accordingly, for ease of explanation and illustration, the Z components of the forces have been omitted from discussion and FIG. 18.

Because of the orientation of the first maneuverability propulsion mechanism 1802-1 in the first direction and because the first maneuverability propulsion mechanism 1802-1 is producing a first force 1803-1 having the first magnitude, the first force 1803-1 has a direction that includes a positive X component 1803-1*x* and a negative Y component 1803-1*y*. Likewise, because of the orientation of the sixth maneuverability propulsion mechanism 1802-6 in the second direction and because the sixth maneuverability propulsion mechanism 1802-6 is producing a sixth force 1803-6 having the first magnitude, the sixth force 1803-6 has a direction that includes a positive X component 1803-6*x* and a positive Y component 1803-6*y*. In addition, because both forces 1803-1 and 1803-6 are of approximately equal magnitude and the orientation of the maneuverability propulsion mechanisms are both approximately thirty degrees but in opposing directions, the magnitude of the respective X components are approximately equal, the direction of the X components are the same, the magnitude of the respective Y components are approximately equal, and the direction of the Y components are opposite. Summing the forces 1803-1 and 1803-6, the resultant force 1807-1 for the first pair 1806-1 of maneuverability propulsion mechanisms has a third magnitude, a positive X component that is the sum of the X component 1803-1*x* and the X component 1803-6*x*, and no Y component, because the sum of the positive Y component 1803-6*y* and the negative Y component 1803-1*y* cancel each other out.

Turning to the second pair 1806-2 of maneuverability propulsion mechanisms 1802-2 and 1802-3, because of the orientation of the third maneuverability propulsion mechanism 1802-3 in the first direction and because the third maneuverability propulsion mechanism 1802-3 is producing a third force 1803-3 having the first magnitude, the third force 1803-3 has a direction that includes a positive X component 1803-3*x* and a positive Y component 1803-3*y*. Likewise, because of the orientation of the second maneuverability propulsion mechanism 1802-2 in the second direction and because the second maneuverability propulsion mechanism 1802-2 is producing a second force 1803-2 having the second magnitude, the second force 1803-2 has a direction that includes a negative X component 1803-2*x* and a positive Y component 1803-2*y*. Summing the forces 1803-3 and 1803-2, the resultant force 1807-2 for the second pair 1806-2 of maneuverability propulsion mechanisms has a fourth magnitude, a positive X component 1807-2*x* that is the difference of the larger positive X component 1803-3*x* and the smaller negative X component 1803-2*x*, and a positive Y component 1807-2*y* that is the sum of the positive Y component 1803-3*y* and the positive Y component 1803-2*y*.

For the third pair 1806-3 of maneuverability propulsion mechanisms 1802-5 and 1802-4, because of the orientation of the fifth maneuverability propulsion mechanism 1802-5 in the first direction and because the fifth maneuverability propulsion mechanism 1802-5 is producing a fifth force 1803-5 having the second magnitude, the fifth force 1803-5 has a direction that includes a negative X component 1803-5*x* and a negative Y component 1803-5*y*. Likewise, because of the orientation of the fourth maneuverability propulsion mechanism 1802-4 in the second direction and because the fourth maneuverability propulsion mechanism 1802-4 is producing a fourth force 1803-4 having the first magnitude, the fourth force 1803-4 has a direction that includes a positive X component 1803-4*x* and a negative Y component 1803-4*y*. Summing the forces 1803-5 and 1803-4, the resultant force 1807-3 for the third pair 1806-3 of maneuverability propulsion mechanisms has the fourth magnitude, a positive X component 1807-3*x* that is the difference of the larger positive X component 1803-4*x* and the smaller negative X component 1803-5*x*, and a negative Y component 1807-3*y* that is the sum of the negative Y component 1803-5*y* and the negative Y component 1803-4*y*.

Because of the positioning of the second pair 1806-2 with respect to the third pair 1806-3 of maneuverability propulsion mechanisms and because the pairs are producing similar forces, the resultant forces 1807-2 and 1807-3 have approximately the same magnitude, the fourth magnitude, approximately the same X component magnitudes having the same directions, and approximately equal Y component magnitudes, but having opposite directions.

Finally, summing each of the three resultant forces 1807-1, 1807-2, and 1807-3, the net force 1809 has a fifth magnitude, a positive X direction having a magnitude that is the sum of the x components 1807-1*x*, 1807-2*x*, and 1807-3*x* of the first resultant force 1807-1, the second resultant force 1807-2, and the third resultant force 1807-3 and no Y component, because first resultant force 1807-1 has no Y component and the magnitudes of opposing Y components 1807-2*y* and 1807-3*y* of the second resultant force 1807-2 and third resultant force 1807-3 cancel each other out. Because the net force 1809 has a fifth magnitude, a positive X component and no Y component, the net force 1809 will cause the aerial vehicle 1800 to surge in the positive X direction.

Figure 19:
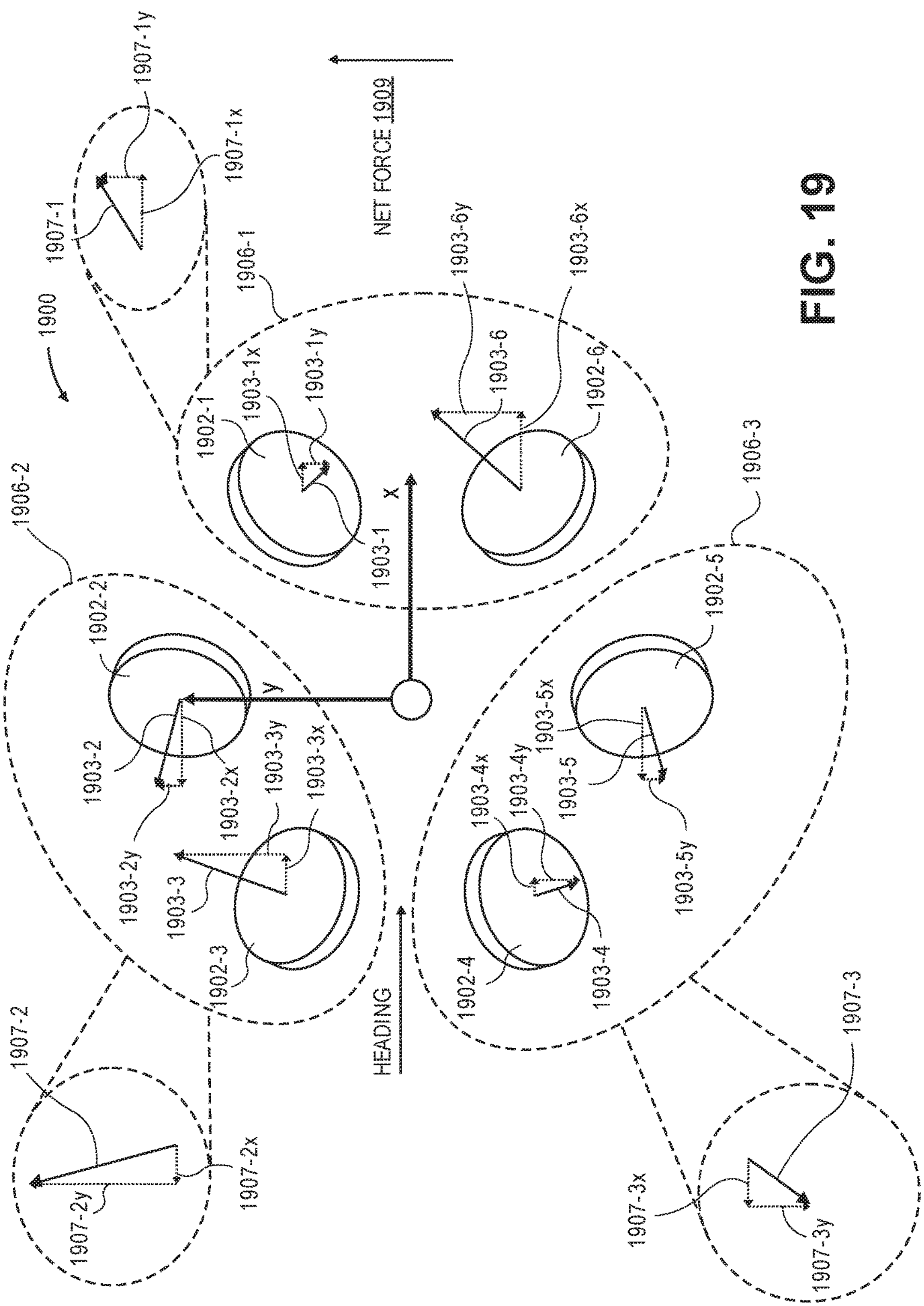
FIG. 19 is a diagram of the maneuverability propulsion mechanisms of the aerial vehicle illustrated in FIG. 17 with thrust vectors to cause the aerial vehicle to sway in the Y direction, according to an implementation.

FIG. 19 is a diagram of the maneuverability propulsion mechanisms 1902 of the aerial vehicle illustrated in FIG. 17 with thrust vectors 1903 to cause the aerial vehicle to sway in the Y direction, according to an implementation. The maneuverability propulsion mechanisms 1902 illustrated in FIG. 19 correspond to the maneuverability propulsion mechanisms illustrated in FIG. 17. As discussed above, each of the maneuverability propulsion mechanisms 1902 are approximately in the same plane, in this example, the X-Y plane and oriented in pairs 1906 as discussed above. Likewise, while the aerial vehicle may navigate in any direction, FIG. 19 indicates a heading of the aerial vehicle 1900.

In the configuration of the aerial vehicle 1900, to cause the aerial vehicle 1900 to sway in the Y direction, the first maneuverability propulsion mechanism 1902-1 generates a first force 1903-1 of a first magnitude, the second maneuverability propulsion mechanism 1902-2 generates a second force 1903-2 of a second magnitude, the third maneuverability propulsion mechanism 1902-3 generates a third force of a third magnitude, the fourth maneuverability propulsion mechanism 1902-4 generates a fourth force 1903-4 of a fourth magnitude, the fifth maneuverability propulsion mechanism 1902-5 generates a fifth force 1903-5 of a fifth magnitude, and the sixth maneuverability propulsion mechanism 1902-6 generates a sixth force 1903-6 of a sixth magnitude.

Each of the forces 1903-1, 1903-2, 1903-3, 1903-4, 1903-5, and 1903-6 have an X component, a Y component, and a Z component. As discussed above, the sum of the Z components of the forces 1903-1, 1903-2, 1903-3, 1903-4, 1903-5, and 1903-6 in the illustrated example is equal and opposite to the gravitational force acting upon the aerial vehicle. Accordingly, for ease of explanation and illustration, the Z components of the forces have been omitted from discussion and FIG. 19.

Because of the orientation of the first maneuverability propulsion mechanism 1902-1 in the first direction and because the first maneuverability propulsion mechanism 1902-1 is producing a first force 1903-1 having the first magnitude, the first force 1903-1 has a direction that includes a positive X component 1903-1*x* and a negative Y component 1903-1*y*. Likewise, because of the orientation of the sixth maneuverability propulsion mechanism 1902-6 in the second direction and because the sixth maneuverability propulsion mechanism 1902-6 is producing a sixth force 1903-6 having a sixth magnitude, the sixth force 1903-6 has a direction that includes a positive X component 1903-6*x* and a positive Y component 1903-6*y*. Summing the forces 1903-1 and 1903-6, the resultant force 1907-1 for the first pair 1906-1 of maneuverability propulsion mechanisms has a seventh magnitude, a positive X component 1907-1*x* that is the sum of the X component 1903-1*x* and the X component 1903-6*x*, and positive Y component 1907-1*y* that is the difference between the larger positive Y component 1903-6*y* and the smaller negative Y component 1903-1*y*.

Turning to the second pair 1906-2 of maneuverability propulsion mechanisms 1902-2 and 1902-3, because of the orientation of the third maneuverability propulsion mechanism 1902-3 in the first direction and because the third maneuverability propulsion mechanism 1902-3 is producing the third force 1903-3 having the third magnitude, the third force 1903-3 has a direction that includes a positive X component 1903-3*x* and a positive Y component 1903-3*y*. Likewise, because of the orientation of the second maneuverability propulsion mechanism 1902-2 in the second direction and because the second maneuverability propulsion mechanism 1902-2 is producing a second force 1903-2 having the second magnitude, the second force 1903-2 has a direction that includes a negative X component 1903-2*x* and a positive Y component 1903-2*y*. Summing the forces 1903-3 and 1903-2, the resultant force 1907-2 for the second pair 1906-2 of maneuverability propulsion mechanisms has an eighth magnitude, a negative X component 1907-2*x* that is the difference of the larger negative X component 1903-2*x* and the smaller positive X component 1903-3*x*, and a positive Y component 1907-2*y* that is the sum of the positive Y component 1903-3*y* and the positive Y component 1903-2*y*.

For the third pair 1906-3 of maneuverability propulsion mechanisms 1902-5 and 1902-4, because of the orientation of the fifth maneuverability propulsion mechanism 1902-5 in the first direction and because the fifth maneuverability propulsion mechanism 1902-5 is producing the fifth force 1903-5 having the fifth magnitude, the fifth force 1903-5 has a direction that includes a negative X component 1903-5*x* and a negative Y component 1903-5*y*. Likewise, because of the orientation of the fourth maneuverability propulsion mechanism 1902-4 in the second direction and because the fourth maneuverability propulsion mechanism 1902-4 is producing the fourth force 1903-4 having the fourth magnitude, the fourth force 1903-4 has a direction that includes a positive X component 1903-4*x* and a negative Y component 1903-4*y*. Summing the forces 1903-5 and 1903-4, the resultant force 1907-3 for the third pair 1906-3 of maneuverability propulsion mechanisms has a ninth magnitude, a negative X component 1907-3*x* that is the difference of the larger negative X component 1903-5*x* and the smaller positive X component 1903-4*x*, and a negative Y component 1907-3*y* that is the sum of the negative Y component 1903-5*y* and the negative Y component 1903-4*y*.

Because of the positioning of the three pairs of maneuverability components 1906-1, 1906-2, and 1906-3, the sum of the resultant forces 1907-1, 1907-2, and 1907-3 results in a net force 1909 having a tenth magnitude, a positive Y component and no X component. For example, summing the resultant X components 1907-1*x*, 1907-2*x*, and 1907-3*x*, the two negative X components 1907-2*x* and 1907-3*x* combine to cancel out the positive X component 1907-1*x*, resulting in no X component for the net force 1909. Similarly, the sum of the two positive Y components 1907-1*y* and 1907-2*y* are larger than the negative Y component 1907-3*y* such that the sum of all the resultant Y components provides a positive Y component for the net force 1909 such that the aerial vehicle 1900 will sway in the positive Y direction.

Figure 20:
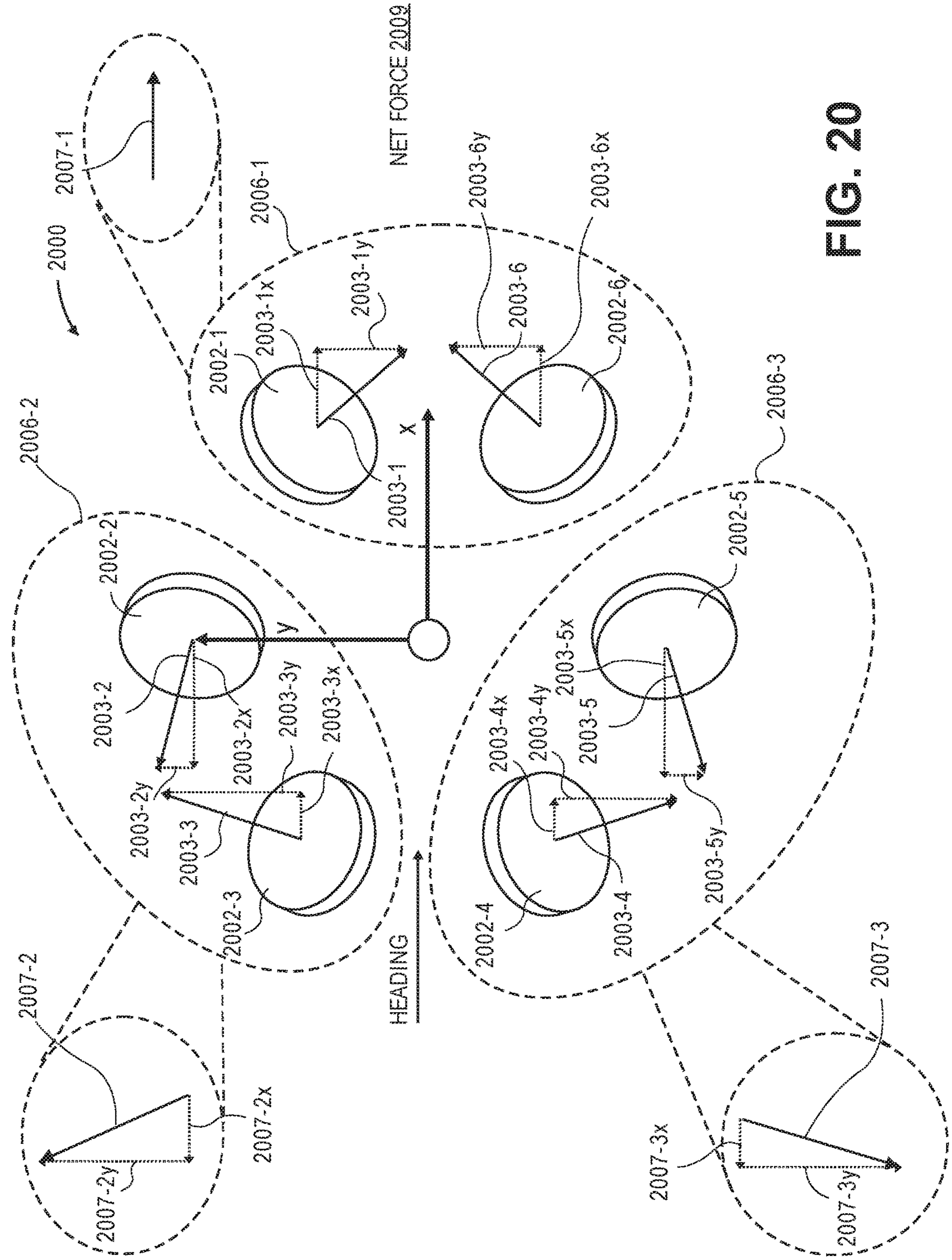
FIG. 20 is a diagram of the maneuverability propulsion mechanisms of the aerial vehicle illustrated in FIG. 17 with thrust vectors to cause the aerial vehicle to hover or heave in the Z direction, according to an implementation.

FIG. 20 is a diagram of the maneuverability propulsion mechanisms 2002 of the aerial vehicle illustrated in FIG. 17 with thrust vectors 2003 to cause the aerial vehicle to hover, ascend or descend in the Z direction, according to an implementation. The maneuverability propulsion mechanisms 2002 illustrated in FIG. 20 correspond to the maneuverability propulsion mechanisms illustrated in FIG. 17. As discussed above, each of the maneuverability propulsion mechanisms 2002 are approximately in the same plane, in this example, the X-Y plane and oriented in pairs 2006 as discussed above. Likewise, while the aerial vehicle may navigate in any direction, FIG. 20 indicates a heading of the aerial vehicle 2000.

In the configuration of the aerial vehicle 2000, to cause the aerial vehicle 2000 to hover, ascend or descend in the Z direction, the first maneuverability propulsion mechanism 2002-1, the second maneuverability propulsion mechanism 2002-2, the third maneuverability propulsion mechanism 2002-3, the fourth maneuverability propulsion mechanism 2002-4, the fifth maneuverability propulsion mechanism 2002-5, and the sixth maneuverability propulsion mechanism 2002-6 all generate a force 2003 of approximately equal magnitude, referred to in this example as a first magnitude.

Each of the forces 2003-1, 2003-2, 2003-3, 2003-4, 2003-5, and 2003-6 have an X component, a Y component, and a Z component. As discussed above, in implementations in which the aerial vehicle is to maintain a hover, the sum of the Z components of the forces 2003-1, 2003-2, 2003-3, 2003-4, 2003-5, and 2003-6 in the illustrated example is equal and opposite to the gravitational force acting upon the aerial vehicle. If the aerial vehicle is to ascend, the force generated by each of the maneuverability propulsion mechanisms is increased in equal amounts such that the sum of the forces in the Z direction is larger than the gravitational force. In comparison, if the aerial vehicle is to descend, the forces generated by each of the maneuverability propulsion mechanisms is decreased by equal amounts such that the sum of the forces in the Z direction is less than the gravitational force. For ease of explanation and illustration, the Z components of the forces have been omitted from discussion and FIG. 20. Discussion with respect to FIG. 20 will illustrate how the sum X components and Y components cancel out such that the net force 2009 only has a Z component.

Because of the orientation of the first maneuverability propulsion mechanism 2002-1 in the first direction and because the first maneuverability propulsion mechanism 2002-1 is producing a first force 2003-1 having the first magnitude, the first force 2003-1 has a direction that includes a positive X component 2003-1*x* and a negative Y component 2003-1*y*. Likewise, because of the orientation of the sixth maneuverability propulsion mechanism 2002-6 in the second direction and because the sixth maneuverability propulsion mechanism 2002-6 is producing a sixth force 2003-6 having the first magnitude, the sixth force 2003-6 has a direction that includes a positive X component 2003-6*x* and a positive Y component 2003-6*y*. In addition, because the sixth force 2003-6 and the first force 2003-1 have the same first magnitude and are oriented in opposing directions, the magnitude of the respective X components and Y components are the same. Likewise, the direction of the respective X components are the same and the direction of the respective Y components are opposite. Summing the forces 2003-1 and 2003-6, the resultant force 2007-1 for the first pair 2006-1 of maneuverability propulsion mechanisms has a second magnitude, a positive X component that is the sum of the X component 2003-1*x* and the X component 2003-6*x*, and no Y component, because the opposing Y components 2003-1*y* and 2003-6*y* cancel each other out.

Turning to the second pair 2006-2 of maneuverability propulsion mechanisms 2002-2 and 2002-3, because of the orientation of the third maneuverability propulsion mechanism 2002-3 in the first direction and because the third maneuverability propulsion mechanism 2002-3 is producing the third force 2003-3 having the first magnitude, the third force 2003-3 has a direction that includes a positive X component 2003-3*x* and a positive Y component 2003-3*y*. Likewise, because of the orientation of the second maneuverability propulsion mechanism 2002-2 in the second direction and because the second maneuverability propulsion mechanism 2002-2 is producing a second force 2003-2 having the first magnitude, the second force 2003-2 has a direction that includes a negative X component 2003-2*x* and a positive Y component 2003-2*y*. Summing the forces 2003-3 and 2003-2, the resultant force 2007-2 for the second pair 2006-2 of maneuverability propulsion mechanisms has a third magnitude, a negative X component 2007-2*x* that is the difference of the larger negative X component 2003-2*x* and the smaller positive X component 2003-3*x*, and a positive Y component 2007-2*y* that is the sum of the positive Y component 2003-3*y* and the positive Y component 2003-2*y*.

For the third pair 2006-3 of maneuverability propulsion mechanisms 2002-5 and 2002-4, because of the orientation of the fifth maneuverability propulsion mechanism 2002-5 in the first direction and because the fifth maneuverability propulsion mechanism 2002-5 is producing the fifth force 2003-5 having the first magnitude, the fifth force 2003-5 has a direction that includes a negative X component 2003-5*x* and a negative Y component 2003-5*y*. Likewise, because of the orientation of the fourth maneuverability propulsion mechanism 2002-4 in the second direction and because the fourth maneuverability propulsion mechanism 2002-4 is producing the fourth force 2003-4 having the first magnitude, the fourth force 2003-4 has a direction that includes a positive X component 2003-4*x* and a negative Y component 2003-4*y*. Summing the forces 2003-5 and 2003-4, the resultant force 2007-3 for the third pair 2006-3 of maneuverability propulsion mechanisms has the third magnitude, a negative X component 2007-3*x* that is the difference of the larger negative X component 2003-5*x* and the smaller positive X component 2003-4*x*, and a negative Y component 2007-3*y* that is the sum of the negative Y component 2003-5*y* and the negative Y component 2003-4*y*.

Because of the positioning of the three pairs of maneuverability components 2006-1, 2006-2, and 2006-3, the sum of the resultant forces 2007-1, 2007-2, and 2007-3 result in a net force 2009 having no X component and no Y component. Specifically, the positive Y component 2007-2*y* cancels out with the negative Y component 2007-3*y* because they have the same magnitude and opposite directions. Likewise, each of the negative X components 2007-2*x* and 2007-3*x* are approximately one-half of the positive X component 2007-1*x* and combined the three X components cancel out. If the sum of the positive components of the forces 2003 generated from the maneuverability propulsion mechanisms 2002 is equal and opposite the force of gravity, the aerial vehicle 2000 will hover. In comparison, if the sum of the positive Z components of the forces 2003 is greater than the force of gravity, the aerial vehicle 2000 will heave in the positive Z direction (i.e., in a substantially positive vertical direction). In comparison, if the sum of the Z components of the forces 2003 is less than the force of gravity, the aerial vehicle 2000 will heave in the negative Z direction (i.e., in a substantially negative vertical direction).

Figure 21:
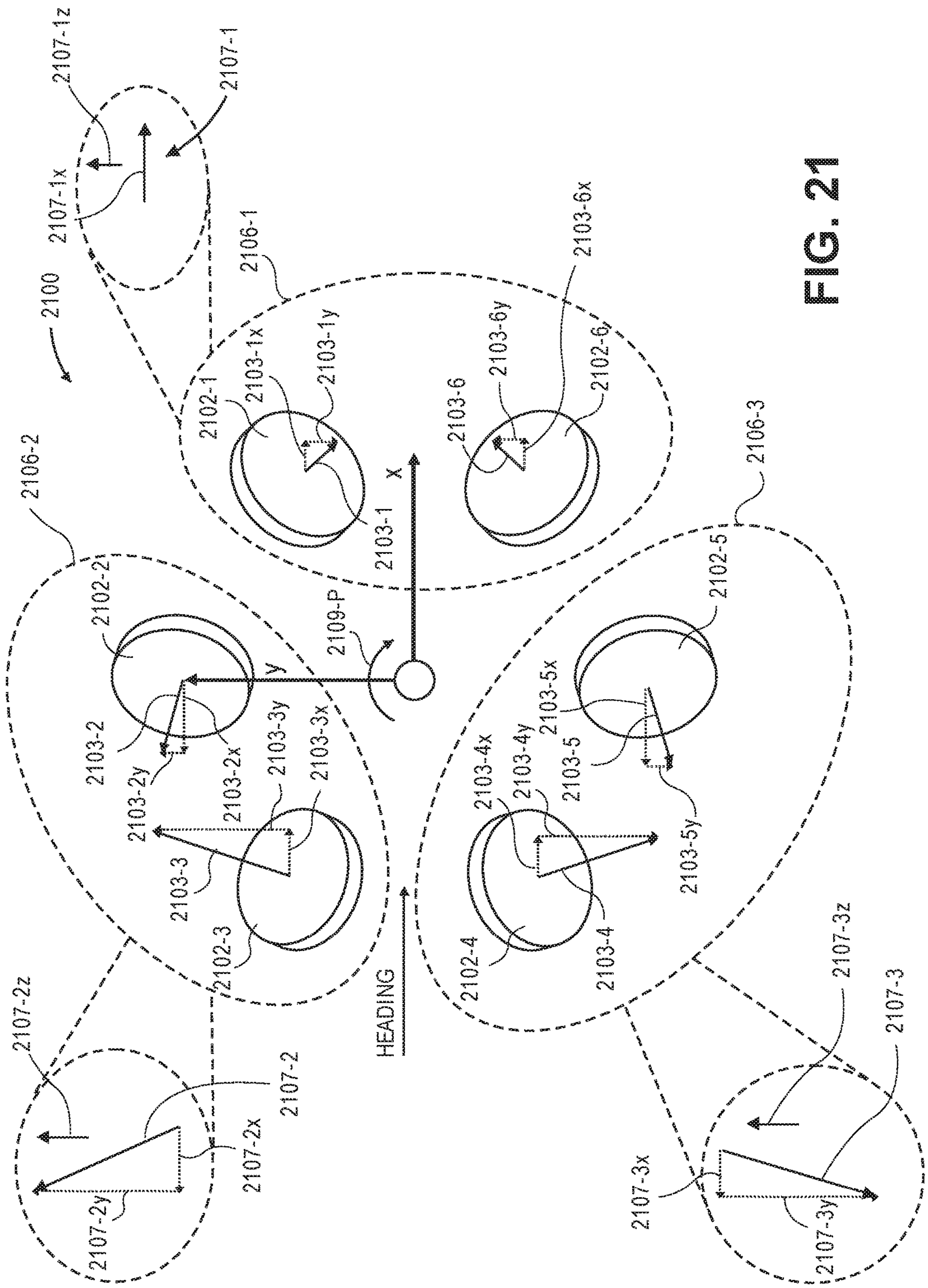
FIG. 21 is a diagram of the propulsion mechanism of the aerial vehicle illustrated in FIG. 17 with thrust vectors to cause the aerial vehicle to pitch, according to an implementation.

FIG. 21 is a diagram of the maneuverability propulsion mechanisms 2102 of the aerial vehicle illustrated in FIG. 17 with thrust vectors 2103 to cause the aerial vehicle to pitch about the Y axis, according to an implementation. The maneuverability propulsion mechanisms 2102 illustrated in FIG. 21 correspond to the maneuverability propulsion mechanisms illustrated in FIG. 17. As discussed above, each of the maneuverability propulsion mechanisms 2102 are approximately in the same plane, in this example, the X-Y plane and oriented in pairs 2106 as discussed above. Likewise, while the aerial vehicle may navigate in any direction, FIG. 21 indicates a heading of the aerial vehicle 2100.

In the configuration of the aerial vehicle 2100, to cause the aerial vehicle 2100 to pitch about the Y axis, the first maneuverability propulsion mechanism 2102-1 and the sixth maneuverability propulsion mechanism 2102-6 generate a first force 2103-1 and sixth force 2103-6 that have approximately a same first magnitude. The third maneuverability propulsion mechanism 2102-3 and the fourth maneuverability propulsion mechanism 2104-2 generate a third force 2103-3 and a fourth force 2103-4 that have approximately a same second magnitude that is greater than the first magnitude. The second maneuverability propulsion mechanism 2102-2 and the fifth maneuverability propulsion mechanism 2102-5 produce a second force 2103-2 and a fifth force 2103-5 that have approximately a same third magnitude that is greater than the first magnitude and less than the second magnitude.

Each of the forces 2103-1, 2103-2, 2103-3, 2103-4, 2103-5, and 2103-6 have an X component, a Y component, and a Z component. In this example, to cause the aerial vehicle 2100 to pitch forward about the Y axis without also surging in the X direction, swaying in the Y direction, or heaving in the Z direction, the sum of the X components of all the forces generated by the maneuverability propulsion mechanisms cancel out, the sum of the Y components of all the forces generated by the maneuverability propulsion mechanisms cancel out, and the sum of the Z components of all the forces generated by the maneuverability propulsion mechanisms and the force of gravity cancel out. However, as discussed further below, because the forces are produced at distances from the origin 2111, or center of gravity of the aerial vehicle 2100, and the magnitude of the Z component of the resultant force 2107-2 from the second pair of propulsion mechanisms 2106-2 and magnitude of the Z component of the resultant force 2107-3 from the third propulsion mechanism 2106-3 are larger than the magnitude of the Z component of the resultant force 2107-1 from the first pair of maneuverability propulsion mechanisms 2106-1, the difference in the magnitude of the Z components of the forces and the offset from the origin 2111 produce a moment about the Y axis that causes the aerial vehicle to pitch forward about the Y axis. The greater the difference between the magnitude of the combination of Z components of the second pair of propulsion mechanisms 2106-2 and the third pair of propulsion mechanisms 2106-3 compared to the Z component of the first pair of propulsion mechanisms 2106-1, the greater the moment about the Y axis and the more the aerial vehicle will pitch about the Y axis. For ease of explanation and illustration, the Z components of the individual forces have been omitted from discussion and FIG. 21.

Because of the orientation of the first maneuverability propulsion mechanism 2102-1 in the first direction and because the first maneuverability propulsion mechanism 2102-1 is producing a first force 2103-1 having the first magnitude, the first force 2103-1 has a direction that includes a positive X component 2103-1$x$ and a negative Y component 2103-1$y$. Likewise, because of the orientation of the sixth maneuverability propulsion mechanism 2102-6 in the second direction and because the sixth maneuverability propulsion mechanism 2102-6 is producing a sixth force 2103-6 having the first magnitude, the sixth force 2103-6 has a direction that includes a positive X component 2103-6$x$ and a positive Y component 2103-6$y$. In addition, because the sixth force 2103-6 and the first force 2103-1 have the same first magnitude and are oriented in opposing directions, the magnitude of the respective X components and Y components are the same. Likewise, the direction of the respective X components are the same and the direction of the respective Y components are opposite. Summing the forces 2103-1 and 2103-6, the resultant force 2107-1 for the first pair 2106-1 of maneuverability propulsion mechanisms has a fourth magnitude, a positive X component 2107-1$x$ that is the sum of the X component 2103-1$x$ and the X component 2103-6$x$, and no Y component, because the opposing Y components 2103-1$y$ and 2103-6$y$ cancel each other out. In addition, the resultant force 2107-1 of the first pair 2106-1 has a Z component 2107-1$z$ having a fifth magnitude in a positive Z component that is the sum of the positive Z components of the forces 2103-1 and 2103-6.

Turning to the second pair 2106-2 of maneuverability propulsion mechanisms 2102-2 and 2102-3, because of the orientation of the third maneuverability propulsion mechanism 2102-3 in the first direction and because the third maneuverability propulsion mechanism 2102-3 is producing the third force 2103-3 having the second magnitude, the third force 2103-3 has a direction that includes a positive X component 2103-3$x$ and a positive Y component 2103-3$y$. Likewise, because of the orientation of the second maneuverability propulsion mechanism 2102-2 in the second direction and because the second maneuverability propulsion mechanism 2102-2 is producing a second force 2103-2 having the third magnitude, the second force 2103-2 has a direction that includes a negative X component 2103-2$x$ and a positive Y component 2103-2$y$. Summing the forces 2103-3 and 2103-2, the resultant force 2107-2 for the second pair 2106-2 of maneuverability propulsion mechanisms has a sixth magnitude, a negative X component 2107-2$x$ that is the difference of the larger negative X component 2103-2$x$ and the smaller positive X component 2103-3$x$, and a positive Y component 2107-2$y$ that is the sum of the positive Y component 2103-3$y$ and the positive Y component 2103-2$y$. In addition, the resultant force 2107-2 of the second pair 2106-2 has a Z component having a seventh magnitude in a positive Z component that is larger than the fifth magnitude of the Z component 2107-1$z$ of the first resultant force 2107-1.

For the third pair 2106-3 of maneuverability propulsion mechanisms 2102-5 and 2102-4, because of the orientation of the fifth maneuverability propulsion mechanism 2102-5 in the first direction and because the fifth maneuverability propulsion mechanism 2102-5 is producing the fifth force 2103-5 having the third magnitude, the fifth force 2103-5 has a direction that includes a negative X component 2103-5$x$ and a negative Y component 2103-5$y$. Likewise, because of the orientation of the fourth maneuverability propulsion mechanism 2102-4 in the second direction and because the fourth maneuverability propulsion mechanism 2102-4 is producing the fourth force 2103-4 having the second magnitude, the fourth force 2103-4 has a direction that includes a positive X component 2103-4$x$ and a negative Y component 2103-4$y$. Summing the forces 2103-5 and 2103-4, the resultant force 2107-3 for the third pair 2106-3 of maneuverability propulsion mechanisms has the sixth magnitude, a negative X component 2107-3$x$ that is the difference of the larger negative X component 2103-5$x$ and the smaller positive X component 2103-4$x$, and a negative Y component 2107-3$y$ that is the sum of the negative Y component 2103-5$y$ and the negative Y component 2103-4$y$. In addition, the resultant force 2107-3 of the third pair 2106-3 has a Z component 2107-3 having the seventh magnitude in a positive Z component that is larger than the fifth magnitude of the Z component 2107-1$z$ of the first resultant force 2107-1.

Because of the positioning of the three pairs of maneuverability components 2106-1, 2106-2, and 2106-3, the sum of the resultant forces 2107-1, 2107-2, and 2107-3 results in a net force having no X component and no Y component. Specifically, the positive Y component 2107-2$y$ cancels out with the negative Y component 2107-3$y$ because they have the same magnitude and opposite directions. Likewise, each of the negative X components 2107-2$x$ and 2107-3$x$ are approximately one-half of the positive X component 2107-1$x$ and combined the three X components cancel out. Likewise, the sum of the magnitude of the Z components of the resultant forces 2107-1, 2107-2, and 2107-3 is equal and opposite to the force of gravity acting on the aerial vehicle 1900. However, because the seventh magnitude of Z components 2107-2$z$ and 2107-3$z$ of the resultant forces 2107-2 and 2107-3 from the second pair of maneuverability propulsion mechanisms 2106-2 and the third pair of maneuverability propulsion mechanisms 2106-3 are each greater than fifth magnitude of the Z component 2107-1$z$ of the resultant force 2107-1 of the first pair of maneuverability propulsion mechanisms 2106-1 and those forces are separated a distance from the origin 2111, a moment 2109-P about the Y axis results that causes the aerial vehicle 1900 to pitch forward about the Y axis.

FIG. 22 is a diagram of the maneuverability propulsion mechanisms 2202 of the aerial vehicle illustrated in FIG. 17 with thrust vectors 2203 to cause the aerial vehicle to yaw about the Z axis, according to an implementation. The maneuverability propulsion mechanisms 2202 illustrated in FIG. 22 correspond to the maneuverability propulsion mechanisms illustrated in FIG. 17. As discussed above, each of the maneuverability propulsion mechanisms 2202 are approximately in the same plane, in this example, the X-Y plane and oriented in pairs 2206 as discussed above. Likewise, while the aerial vehicle may navigate in any direction, FIG. 22 indicates a heading of the aerial vehicle 2200.

In the configuration of the aerial vehicle 2200, to cause the aerial vehicle 2200 to yaw about the Z axis, the first maneuverability propulsion mechanism 2202-1, the third maneuverability propulsion mechanism 2202-3, and the fifth maneuverability propulsion mechanism 2202-5 generate a first force 2203-1, a third force 2203-3, and fifth force 2203-5 that each have approximately a same first magnitude. Likewise, the second maneuverability propulsion mechanism 2202-2, the fourth maneuverability propulsion mechanism 2204-4, and the sixth maneuverability propulsion mechanism 2202-6 generate a second force 2203-2, a fourth force 2203-4, and a sixth force 2203-6 that each have approximately a same second magnitude that is larger than the first magnitude.

Each of the forces 2203-1, 2203-2, 2203-3, 2203-4, 2203-5, and 2203-6 have an X component, a Y component, and a Z component. In this example, to cause the aerial vehicle 2200 to yaw about the Z axis without also surging in the X direction, swaying in the Y direction, or heaving in the Z direction, the sum of the X components of all the forces generated by the maneuverability propulsion mechanisms cancel out, the sum of the Y components of all the forces generated by the maneuverability propulsion mechanisms cancel out, and the sum of the Z components of all the forces generated by the maneuverability propulsion mechanisms and the force of gravity cancel out. However, as discussed further below, because the forces are produced at distances from the origin 2211, or a center of gravity of the aerial vehicle 2200, the resultant forces 2207-1, 2207-2, and 2207-3 of the pairs of maneuverability propulsion mechanisms 2206-1, 2206-2, and 2206-3 cause a moment about the Z axis in a counter-clockwise direction that cause the aerial vehicle to yaw about the Z axis in the counter-clockwise direction.

Because of the orientation of the first maneuverability propulsion mechanism 2202-1 in the first direction and because the first maneuverability propulsion mechanism 2202-1 is producing a first force 2203-1 having the first magnitude, the first force 2203-1 has a direction that includes a positive X component 2203-1*x* and a negative Y component 2203-1*y*. Likewise, because of the orientation of the sixth maneuverability propulsion mechanism 2202-6 in the second direction and because the sixth maneuverability propulsion mechanism 2202-6 is producing a sixth force 2203-6 having the second magnitude, the sixth force 2203-6 has a direction that includes a positive X component 2203-6*x* and a positive Y component 2203-6*y*. Summing the forces 2203-1 and 2203-6, the resultant force 2207-1 for the first pair 2206-1 of maneuverability propulsion mechanisms has a third magnitude, a positive X component 2207-1*x* that is the sum of the positive X component 2203-1*x* and the positive X component 2203-6*x*, and a positive Y component 2207-1*y* that is the difference between the larger positive Y component 2203-6*y* and the smaller negative Y component 2203-1*y*.

Turning to the second pair 2206-2 of maneuverability propulsion mechanisms 2202-2 and 2202-3, because of the orientation of the third maneuverability propulsion mechanism 2202-3 in the first direction and because the third maneuverability propulsion mechanism 2202-3 is producing the third force 2203-3 having the first magnitude, the third force 2203-3 has a direction that includes a positive X component 2203-3*x* and a positive Y component 2203-3*y*. Likewise, because of the orientation of the second maneuverability propulsion mechanism 2202-2 in the second direction and because the second maneuverability propulsion mechanism 2202-2 is producing a second force 2203-2 having the second magnitude, the second force 2203-2 has a direction that includes a negative X component 2203-2*x* and a positive Y component 2203-2*y*. Summing the forces 2203-3 and 2203-2, the resultant force 2207-2 for the second pair 2206-2 of maneuverability propulsion mechanisms has a fourth magnitude, a negative X component 2207-2*x* that is the difference of the larger negative X component 2203-2*x* and the smaller positive X component 2203-3*x*, and a positive Y component 2207-2*y* that is the sum of the positive Y component 2203-3*y* and the positive Y component 2203-2*y*.

For the third pair 2206-3 of maneuverability propulsion mechanisms 2202-5 and 2202-4, because of the orientation of the fifth maneuverability propulsion mechanism 2202-5 in the first direction and because the fifth maneuverability propulsion mechanism 2202-5 is producing the fifth force 2203-5 having the first magnitude, the fifth force 2203-5 has a direction that includes a negative X component 2203-5*x* and a negative Y component 2203-5*y*. Likewise, because of the orientation of the fourth maneuverability propulsion mechanism 2202-4 in the second direction and because the fourth maneuverability propulsion mechanism 2202-4 is producing the fourth force 2203-4 having the second magnitude, the fourth force 2203-4 has a direction that includes a positive X component 2203-4*x* and a negative Y component 2203-4*y*. Summing the forces 2203-5 and 2203-4, the resultant force 2207-3 for the third pair 2206-3 of maneuverability propulsion mechanisms has the fourth magnitude, a positive X component 2207-3*x* that is the difference of the larger positive X component 2203-4*x* and the smaller negative X component 2203-5*x*, and a negative Y component 2207-3*y* that is the sum of the negative Y component 2203-5*y* and the negative Y component 2203-4*y*.

Because of the positioning of the three pairs of maneuverability components 2206-1, 2206-2, and 2206-3, the sum of the resultant forces 2207-1, 2207-2, and 2207-3 results in a net force having no X component and no Y component. Likewise, the Z component of the net force is canceled out by the force of gravity. The positive Y component 2207-1*y* and the positive Y component 2207-2*y* cancel out the negative Y component 2207-3*y*. Likewise, the positive X component 2207-1*x* and the positive X component 2207-3*x* cancel out the negative X component 2207-2*x*. Likewise, the sum of the magnitude of the Z components of the resultant forces 2207-1, 2207-2, and 2207-3 is equal and opposite to the force of gravity acting on the aerial vehicle 2200. However, because the resultant forces 2207-1, 2207-2, and 2207-3 are separated by a distance from the origin 2211, or the center of gravity of the aerial vehicle 2211, those forces produce a moment 2209-Y about the Z axis, thereby causing the aerial vehicle 2200 to yaw about the Z axis.

FIG. 23 is a diagram of the maneuverability propulsion mechanisms 2302 of the aerial vehicle illustrated in FIG. 17 with thrust vectors 2303 to cause the aerial vehicle to roll about the X axis, according to an implementation. The maneuverability propulsion mechanisms 2302 illustrated in FIG. 23 correspond to the maneuverability propulsion mechanisms illustrated in FIG. 17. As discussed above, each of the maneuverability propulsion mechanisms 2302 are approximately in the same plane, in this example, the X-Y plane and oriented in pairs 2306 as discussed above. Likewise, while the aerial vehicle may navigate in any direction, FIG. 23 indicates a heading of the aerial vehicle 2300.

In the configuration of the aerial vehicle 2300, to cause the aerial vehicle 2300 to roll about the X axis, the first maneuverability propulsion mechanism 2302-1, the second maneuverability propulsion mechanism 2302-2, and the third maneuverability propulsion mechanism 2302-3 generate a first force 2303-1, a second force 2303-2, and a third force 2303-3 that have approximately a same first magnitude. The fourth maneuverability propulsion mechanism 2302-4, fifth maneuverability propulsion mechanism 2302-5, and the sixth maneuverability propulsion mechanism 2302-6 generate a fourth force 2303-4, a fifth force 2303-5, and a sixth force 2303-6 that have approximately a same second magnitude that is less than the first magnitude.

Each of the forces 2303-1, 2303-2, 2303-3, 2303-4, 2303-5, and 2303-6 have an X component, a Y component, and a Z component. In this example, to cause the aerial vehicle 2300 to roll about the X axis without also surging in the X direction, swaying in the Y direction, or heaving in the Z direction, the sum of the X components of all the forces generated by the maneuverability propulsion mechanisms cancel out, the sum of the Y components of all the forces generated by the maneuverability propulsion mechanisms cancel out, and the sum of the Z components of all the forces generated by the maneuverability propulsion mechanisms and the force of gravity cancel out. However, as discussed further below, because the forces are produced at distances from the origin and the magnitude of the Z component of the forces 2303-1, 2303-2, and 2303-3 are larger than the magnitude of the Z component of the forces 2303-4, 2303-5, and 2303-6, the difference in the magnitude of the Z components of the forces and the offset from the origin 2311 result in a moment about the X axis that causes the aerial vehicle 2300 to roll about the X axis. The greater the difference between the magnitude of the combination of Z components of the first force 2303-1, second force 2303-2, and third force 2303-3 compared to the magnitude of the Z components of the fourth force 2303-4, fifth force 2303-5, and sixth force 2303-6, the larger the moment and the more the aerial vehicle will roll about the X axis. For ease of explanation and illustration, the Z components of the individual forces have been omitted from discussion and FIG. 23.

Because of the orientation of the first maneuverability propulsion mechanism 2302-1 in the first direction and because the first maneuverability propulsion mechanism 2302-1 is producing a first force 2303-1 having the first magnitude, the first force 2303-1 has a direction that includes a positive X component 2303-1*x* and a negative Y component 2303-1*y*. Likewise, because of the orientation of the sixth maneuverability propulsion mechanism 2302-6 in the second direction and because the sixth maneuverability propulsion mechanism 2302-6 is producing a sixth force 2303-6 having the second magnitude, the sixth force 2303-6 has a direction that includes a positive X component 2303-6*x* and a positive Y component 2303-6*y*. Summing the forces 2303-1 and 2303-6, the resultant force 2307-1 for the first pair 2306-1 of maneuverability propulsion mechanisms has a third magnitude, a positive X component 2307-1*x* that is the sum of the X component 2303-1*x* and the X component 2303-6*x*, and negative Y component 2307-1*y* that is the difference between the larger negative Y component 2303-1*y* and the smaller positive Y component 2303-6*y*. In addition, the resultant force 2307-1 of the first pair 2306-1 has a positive Z component 2307-1*z* having a fourth magnitude in a positive Z direction.

Turning to the second pair 2306-2 of maneuverability propulsion mechanisms 2302-2 and 2302-3, because of the orientation of the third maneuverability propulsion mechanism 2302-3 in the first direction and because the third maneuverability propulsion mechanism 2302-3 is producing the third force 2303-3 having the first magnitude, the third force 2303-3 has a direction that includes a positive X component 2303-3*x* and a positive Y component 2303-3*y*. Likewise, because of the orientation of the second maneuverability propulsion mechanism 2302-2 in the second direction and because the second maneuverability propulsion mechanism 2302-2 is producing a second force 2303-2 having the first magnitude, the second force 2303-2 has a direction that includes a negative X component 2303-2*x* and a positive Y component 2303-2*y*. Summing the forces 2303-3 and 2303-2, the resultant force 2307-2 for the second pair 2306-2 of maneuverability propulsion mechanisms has a fifth magnitude, a negative X component 2307-2*x* that is the difference of the larger negative X component 2303-2*x* and the smaller positive X component 2303-3*x*, and a positive Y component 2307-2*y* that is the sum of the positive Y component 2303-3*y* and the positive Y component 2303-2*y*. In addition, the resultant force 2307-2 of the second pair 2306-2 has a positive Z component 2307-2*z* having a sixth magnitude in a positive Z direction that is larger than the fourth magnitude 2307-1*z* of the first resultant force 2307-1.

For the third pair 2306-3 of maneuverability propulsion mechanisms 2302-5 and 2302-4, because of the orientation of the fifth maneuverability propulsion mechanism 2302-5 in the first direction and because the fifth maneuverability propulsion mechanism 2302-5 is producing the fifth force 2303-5 having the second magnitude, the fifth force 2303-5 has a direction that includes a negative X component 2303-5*x* and a negative Y component 2303-5*y*. Likewise, because of the orientation of the fourth maneuverability propulsion mechanism 2302-4 in the second direction and because the fourth maneuverability propulsion mechanism 2302-4 is producing the fourth force 2303-4 having the second magnitude, the fourth force 2303-4 has a direction that includes a positive X component 2303-4*x* and a negative Y component 2303-4*y*. Summing the forces 2303-5 and 2303-4, the resultant force 2307-3 for the third pair 2306-3 of maneuverability propulsion mechanisms has a seventh magnitude, a negative X component 2307-3*x* that is the difference of the larger negative X component 2303-5*x* and the smaller positive X component 2303-4*x*, and a negative Y component 2307-3*y* that is the sum of the negative Y component 2303-5*y* and the negative Y component 2303-4*y*. In addition, the resultant force 2307-3 of the third pair 2306-3 has a Z component having an eighth magnitude in a positive Z direction that is less than the sixth magnitude.

Because of the positioning of the three pairs of maneuverability components 2306-1, 2306-2, and 2306-3, the sum of the resultant forces 2307-1, 2307-2, and 2307-3 results in a net force having no X component and no Y component. Specifically, the positive Y component 2307-2*y* cancels out with the negative Y components 2307-1*y* and 2307-3*y*. Likewise, each of the negative X components 2307-2*x* and 2307-3*x* cancel out the positive X component 2307-1*x*. Likewise, the sum of the magnitude of the Z components of the resultant forces 2307-1, 2307-2, and 2307-3 is equal and opposite to the force of gravity acting on the aerial vehicle 1900. However, because the sum of the Z components of the first force 2303-1, second force 2303-2, and third force 2303-3 is greater than the sum of the Z components of the fourth force 2303-4, fifth force 2303-5, and sixth force 2303-6, and those forces are separated a distance from the origin, a moment 2309-R about the X axis results that causes the aerial vehicle 2300 to roll about the X axis.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

While the above examples have been described with respect to aerial vehicle, the described implementations may also be used for other forms of vehicles, including, but not limited to, ground based vehicles and water based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An aerial vehicle apparatus, comprising:
- a first maneuverability propulsion mechanism oriented in a first direction with respect to a vertical orientation;
- a second maneuverability propulsion mechanism oriented in a second direction with respect to the vertical orientation, wherein the first orientation is opposite the second orientation;
- a third maneuverability propulsion mechanism oriented in the first direction;
- a fourth maneuverability propulsion mechanism oriented in the second direction;
- a fifth maneuverability propulsion mechanism oriented in the first direction;
- a sixth maneuverability propulsion mechanism oriented in the second direction;
- a propulsion mechanism controller configured to at least:
  - send commands to each of the first maneuverability propulsion mechanism, the second maneuverability propulsion mechanism, the third maneuverability propulsion mechanism, the fourth maneuverability propulsion mechanism, the fifth maneuverability propulsion mechanism, and the sixth maneuverability propulsion mechanism to generate respective forces such that the aerial vehicle apparatus can aerially navigate in any of six degrees of freedom;
  - detect a failure of the sixth maneuverability propulsion mechanism; and
  - in response to detecting the failure send commands to each of the first maneuverability propulsion mechanism, the second maneuverability propulsion mechanism, the fourth maneuverability propulsion mechanism, and the fifth maneuverability propulsion mechanism to generate respective forces such that the aerial vehicle apparatus can aerially navigate in any of four degrees of freedom.

2. The aerial vehicle apparatus of claim 1, wherein the first maneuverability propulsion mechanism, the second maneuverability propulsion mechanism, the third maneuverability propulsion mechanism, the fourth maneuverability propulsion mechanism, the fifth maneuverability propulsion mechanism, and the sixth maneuverability propulsion mechanism are substantially aligned in a same X-Y plane.

3. The aerial vehicle apparatus of claim 1, wherein:
- a first force produced by the first maneuverability propulsion mechanism and a sixth force produced by the sixth maneuverability propulsion mechanism form a first resultant force;
- a second force produced by the second maneuverability propulsion mechanism and a third force produced by the third maneuverability propulsion mechanism form a second resultant force; and
- a fourth force produced by the fourth maneuverability propulsion mechanism and a fifth force produced by the fifth maneuverability propulsion mechanism form a third resultant force.

4. The aerial vehicle apparatus of claim 3, wherein a sum of the first resultant force, the second resultant force, and the third resultant force produce a net force having a magnitude, no Y component, and an X component such that the aerial vehicle apparatus surges in an X direction without pitching forward about a Y axis.

5. The aerial vehicle apparatus of claim 3, wherein a sum of the first resultant force, the second resultant force, and the third resultant force produce a net force having a magnitude, no X component, and a Y component such that the aerial vehicle apparatus sways in a Y direction without rolling about an X axis.

6. The aerial vehicle apparatus of claim 3, wherein a sum of the first resultant force, the second resultant force, and the third resultant force produce a net force having no X component, no Y component, and a moment about the Z axis that causes the aerial vehicle apparatus to yaw about the Z axis.

7. The aerial vehicle apparatus of claim 3, wherein a sum of the first resultant force, the second resultant force, and the third resultant force produce a net force having no X component, no Y component, and a moment about the Y axis that causes the aerial vehicle apparatus to pitch about the Y axis.

8. A method to navigate an aerial vehicle, the method comprising:
- receiving a maneuver command that includes a surge command;
- determining a first magnitude for a first force to be produced by a first propulsion mechanism and for a sixth force to be produced by a sixth propulsion mechanism such that, when the first force and the sixth force are combined, a resultant force having a second magnitude, an X component and no Y component is produced;

determining a second magnitude for a second force to be produced by a second propulsion mechanism and for a fifth force to be produced by a fifth propulsion mechanism; sending a command to each of the first propulsion mechanism and the sixth propulsion mechanism to generate the first force and the sixth force, each of the first force and the sixth force having the first magnitude;

sending a command to the second propulsion mechanism and the fifth propulsion mechanism to produce the second force and the fifth force, each of the second force and the fifth force having the second magnitude; and executing by each of the first propulsion mechanism, the third propulsion mechanism, the fifth propulsion mechanism, and the sixth propulsion mechanism the respective commands such that the aerial vehicle surges in an X direction without pitching about the Y axis.

9. The method of claim 8, further comprising:

sending a command to each of a third propulsion mechanism and a fourth propulsion mechanism to generate a third force and a fourth force, each of the third force and the fourth force having the first magnitude; and wherein a sum of the first force, the second force, the third force, the fourth force, the fifth force, and the sixth force is a net force having a third magnitude, an X component, and no Y component.

10. The method of claim 9, wherein:

the second propulsion mechanism is aligned with respect to the third propulsion mechanism such that a sum of the second force and the third force produces a second resultant force that has a third magnitude, a second positive X component and a second positive Y component; and the fourth propulsion mechanism is aligned with respect to the fifth propulsion mechanism such that a sum of the fourth force and the fifth force produces a third resultant force that has a fourth magnitude, a third positive X component and a third negative Y component.

11. The method of claim 10, wherein at least a portion of the second positive Y component cancels out at least a portion of the third negative Y component.

12. The method of claim 9, wherein the net force further includes a Z component that is equal in magnitude and opposite in direction to a gravitational force.

13. The method of claim 8, wherein:

the aerial vehicle includes at least six propulsion mechanisms;

at least one of the at least six propulsion mechanisms is oriented in a first direction with respect to a vertical alignment; and at least one of the at least six propulsion mechanisms is oriented in a second direction with respect to the vertical alignment, wherein the first orientation is opposite the second orientation.

14. An aerial vehicle apparatus, comprising:

a first propulsion mechanism;

a second propulsion mechanism;

a third propulsion mechanism;

a fourth propulsion mechanism;

a fifth propulsion mechanism;

a sixth propulsion mechanism; and wherein:

the first propulsion mechanism and the sixth propulsion mechanism are oriented to form a first pair of propulsion mechanisms in which at least a portion of a first force produced by the first propulsion mechanism cancels out at least a portion of a sixth force produced by the sixth propulsion mechanism;

the second propulsion mechanism and the third propulsion mechanism are oriented to form a second pair of propulsion mechanisms in which at least a portion of a second force produced by the second propulsion mechanism cancels out at least a portion of a third force produced by the third propulsion mechanism;

the fourth propulsion mechanism and the fifth propulsion mechanism are oriented to form a third pair of propulsion mechanisms in which at least a portion of a fourth force produced by the fourth propulsion mechanism cancels out at least a portion of a fifth force produced by the fifth propulsion mechanism; and a payload engagement component configured to engage a payload that includes an item ordered through an electronic commerce website for delivery to a destination by the aerial vehicle apparatus.

15. The aerial vehicle apparatus of claim 14, wherein:

each of the first propulsion mechanism, the second propulsion mechanism, the third propulsion mechanism, the fourth propulsion mechanism, the fifth propulsion mechanism, and the sixth propulsion mechanism are within a plane and extend radially around a central portion of the aerial vehicle apparatus.

16. The aerial vehicle apparatus of claim 14, further comprising:

a first arm extending from a central portion of the aerial vehicle apparatus;

a second arm extending from the central portion of the aerial vehicle apparatus;

a third arm extending from the central portion of the aerial vehicle apparatus;

a fourth arm extending from the central portion of the aerial vehicle apparatus;

a fifth arm extending from the central portion of the aerial vehicle apparatus; and a sixth arm extending from the central portion of the aerial vehicle apparatus.

17. The aerial vehicle apparatus of claim 16, wherein:

the first propulsion mechanism is coupled to an end of the first arm and oriented in a first direction about the first arm with respect to a vertical alignment;

the second propulsion mechanism is coupled to an end of the second arm and oriented in a second direction about the second arm with respect to the vertical alignment;

the third propulsion mechanism is coupled to an end of the third arm and oriented in the first direction about the third arm with respect to the vertical alignment;

the fourth propulsion mechanism is coupled to an end of the fourth arm and oriented in the second direction about the fourth arm with respect to the vertical alignment;

the fifth propulsion mechanism is coupled to an end of the fifth arm and oriented in the first direction about the fifth arm with respect to the vertical alignment; and the sixth propulsion mechanism is coupled to an end of the sixth arm and oriented in the second direction about the sixth arm with respect to the vertical alignment.

18. The aerial vehicle apparatus of claim 16, further comprising:

a controller configured to at least:

send commands to each of the first propulsion mechanism, the second propulsion mechanism, the third propulsion mechanism, the fourth propulsion mechanism, the fifth propulsion mechanism, and the sixth propulsion mechanism to cause the aerial vehicle apparatus to operate in any one or more of six degrees of freedom;

determine one of the first propulsion mechanism, the second propulsion mechanism, the third propulsion mechanism, the fourth propulsion mechanism, the fifth propulsion mechanism, and the sixth propulsion mechanism has failed; and send commands to each of the first propulsion mechanism, the second propulsion mechanism, the third propulsion mechanism, the fourth propulsion mechanism, the fifth propulsion mechanism, and the sixth propulsion mechanism that have not failed to cause the aerial vehicle apparatus to continue to operate in any of four degrees of freedom.

19. The aerial vehicle apparatus of claim 14, wherein a first propulsion mechanism, the second propulsion mechanism, the third propulsion mechanism, the fourth propulsion mechanism, the fifth propulsion mechanism, and the sixth propulsion mechanism are arranged such that the aerial vehicle can aerially navigate independent in any of a surge direction, a heave direction, a sway direction, a pitch direction, a yaw direction, or a roll direction.

20. The aerial vehicle apparatus of claim 14, wherein a net force produced by a sum of the first force, the second force, the third force, the fourth force, the fifth force, and the sixth force has no X component, no Y component, and a moment that causes the aerial vehicle apparatus to pitch about a Y axis, roll about an X axis, or yaw about a Z axis.

* * * * *